(12) United States Patent
Huang et al.

(10) Patent No.: US 12,143,223 B2
(45) Date of Patent: Nov. 12, 2024

(54) HARQ PROCEDURE FOR COOPERATIVE RELAY IN SIDELINK NETWORKS

(71) Applicant: QUALCOMM Incorporated, San Diego, CA (US)

(72) Inventors: Yi Huang, San Diego, CA (US); Seyedkianoush Hosseini, San Diego, CA (US); Wei Yang, San Diego, CA (US); Peter Gaal, San Diego, CA (US); Juan Montojo, San Diego, CA (US); Hwan Joon Kwon, San Diego, CA (US); Krishna Kiran Mukkavilli, San Diego, CA (US); Tingfang Ji, San Diego, CA (US); Ahmed Elshafie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 422 days.

(21) Appl. No.: 17/179,283

(22) Filed: Feb. 18, 2021

(65) Prior Publication Data
US 2022/0263605 A1   Aug. 18, 2022

(51) Int. Cl.
*H04L 1/1812* (2023.01)
*H04L 5/00* (2006.01)
(Continued)

(52) U.S. Cl.
CPC .......... *H04L 1/1816* (2013.01); *H04L 5/0055* (2013.01); *H04W 72/04* (2013.01); *H04W 88/04* (2013.01)

(58) Field of Classification Search
CPC ................. H04L 1/1816; H04L 1/1845; H04L 2001/0093; H04L 2001/0097;
(Continued)

(56) References Cited

U.S. PATENT DOCUMENTS

| 2015/0071276 A1* | 3/2015 | Kim | H04L 1/1845 370/338 |
| 2015/0215903 A1* | 7/2015 | Zhao | H04W 8/005 370/329 |

(Continued)

FOREIGN PATENT DOCUMENTS

| EP | 3618391 A1 * | 3/2020 | ............. H04L 29/06 |
| WO | WO-2022139657 A1 * | 6/2022 | |

OTHER PUBLICATIONS

Xu et al., "Multi-Hop Communications With User Equipment (UE) Cooperation", Huawei Technologies Co., Ltd., U.S. Appl. No. 63/074,651, filed Sep. 4, 2020 (Year: 2020).*

(Continued)

*Primary Examiner* — Shah M Rahman
(74) *Attorney, Agent, or Firm* — QUALCOMM Incorporated

(57) ABSTRACT

Aspects are provided for HARQ feedback and retransmission procedures for cooperative relaying in sidelink networks. A relay attempts to decode sidelink data received from a source for relay to a destination. The relay may combine LLRs for the sidelink data and for a retransmission of the sidelink data. The relay determines a resource of a wireless channel for transmitting feedback to the source in response to the decoding attempt. If decoding is successful, the relay transmits the data to the destination. The destination then attempts to decode the data received from the relay. The destination may combine LLRs for the data and for a retransmission of the data. The destination determines a resource of a wireless channel for transmitting feedback to the relay in response to the decoding attempt. The resources are based on a relay identifier associated with the relay.

29 Claims, 15 Drawing Sheets

(51) Int. Cl.
*H04W 72/04* (2023.01)
*H04W 88/04* (2009.01)

(58) Field of Classification Search
CPC ... H04L 25/0224; H04L 25/067; H04L 5/001; H04L 5/0023; H04L 5/0033; H04L 5/0044; H04L 5/0055; H04L 5/0073; H04L 5/0091; H04W 72/04; H04W 72/21; H04W 88/04
See application file for complete search history.

(56) References Cited

U.S. PATENT DOCUMENTS

| | | | | |
|---|---|---|---|---|
| 2016/0150390 | A1* | 5/2016 | Chen | H04W 8/24 370/328 |
| 2016/0381720 | A1* | 12/2016 | Baek | H04W 8/14 370/329 |
| 2017/0093541 | A1* | 3/2017 | Pan | H04W 72/23 |
| 2018/0054237 | A1* | 2/2018 | Tseng | H04W 72/542 |
| 2019/0053267 | A1* | 2/2019 | Kim | H04W 76/14 |
| 2021/0021536 | A1* | 1/2021 | Ganesan | H04L 1/1893 |
| 2021/0195666 | A1* | 6/2021 | Luo | H04W 88/04 |
| 2021/0377993 | A1* | 12/2021 | Ayaz | H04L 5/0037 |
| 2022/0078755 | A1* | 3/2022 | Xu | H04L 1/1819 |
| 2022/0086722 | A1 | 3/2022 | Gan et al. | |
| 2022/0116958 | A1* | 4/2022 | Liu | H04W 72/23 |
| 2022/0124732 | A1* | 4/2022 | Park | H04W 72/044 |
| 2022/0132471 | A1* | 4/2022 | Hwang | H04L 5/0053 |
| 2022/0200729 | A1* | 6/2022 | Frenzel | H04L 1/1812 |
| 2022/0224409 | A1* | 7/2022 | Perras | H04B 7/2606 |
| 2022/0225290 | A1* | 7/2022 | Ganesan | H04W 72/56 |
| 2022/0264280 | A1* | 8/2022 | Chang | H04W 48/12 |
| 2022/0311582 | A1* | 9/2022 | Ye | H04W 76/14 |
| 2022/0322324 | A1* | 10/2022 | Park | H04L 1/00 |
| 2022/0330281 | A1* | 10/2022 | Lee | H04L 1/1896 |
| 2022/0376827 | A1* | 11/2022 | Seo | H04L 5/0053 |
| 2023/0007670 | A1* | 1/2023 | Lee | H04W 52/243 |
| 2023/0262577 | A1* | 8/2023 | Peng | H04W 8/08 370/315 |
| 2023/0276514 | A1* | 8/2023 | Basu Mallick | H04W 8/005 370/328 |

OTHER PUBLICATIONS

Alcatel-Lucent Shanghai Bell, "Network coded relay and its chase combining", 3GPP TSG-RAN WG1 #58, R1-093356, Shenzhen, China, Aug. 24-28, 2009, Total Pages: 11 (Year: 2009).*

Basu Mallick et al., "Mechanisms for Improved Communications Using Relay Over Sidelink Radio Interface", Lenovo (Singapore) Pte. Ltd., U.S. Appl. No. 63/061,725, filed Aug. 5, 2020, Total Pages: 36 (Year: 2020).*

Basu Mallick et al., "Apparatuses, Methods, and Systems for Determining the Behaviour of a Sidelink Relay UE Using MCR and Zone", Lenovo (Singapore) Pte. Ltd., U.S. Appl. No. 63/061,746, filed Aug. 5, 2020, Total Pages: 41 (Year: 2020).*

* cited by examiner

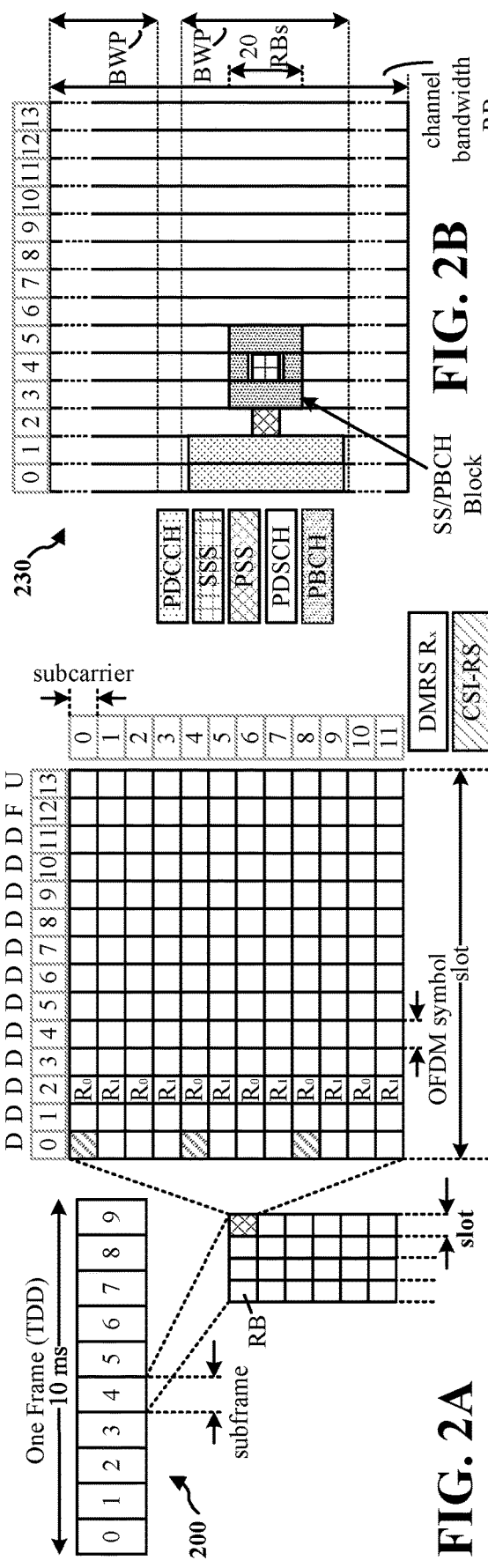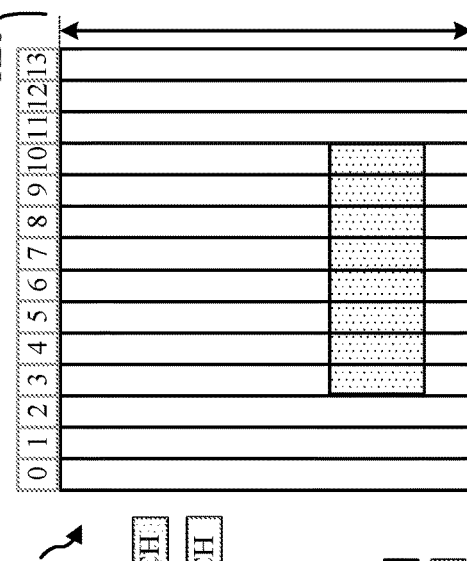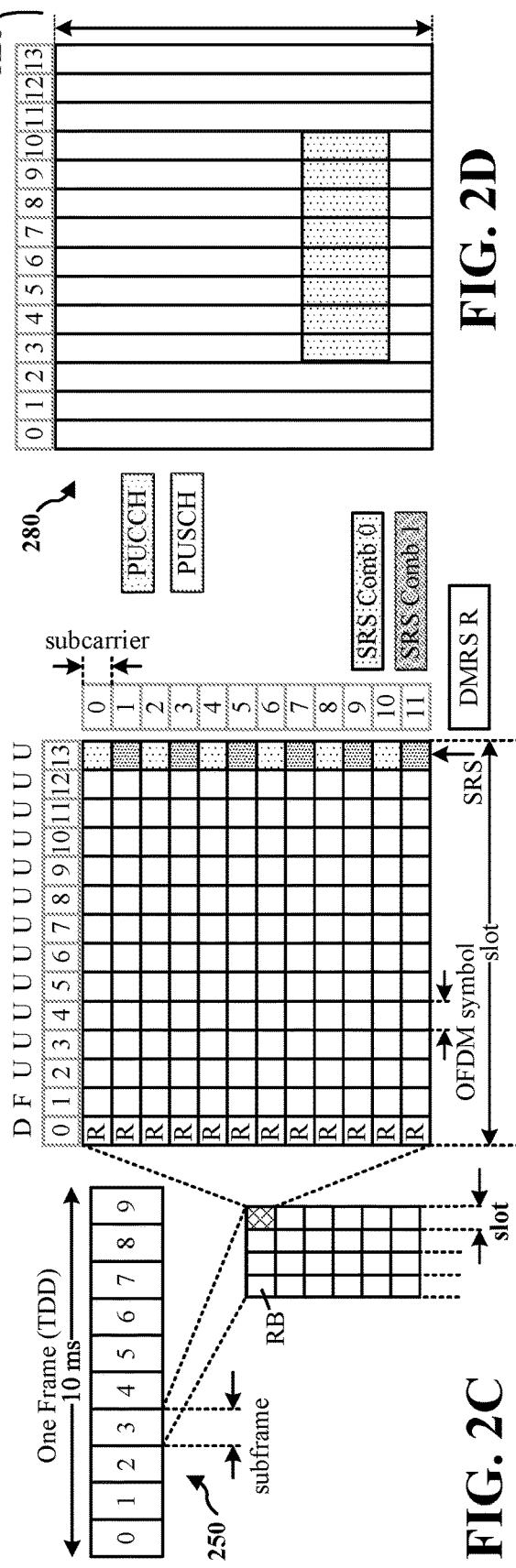
FIG. 2A  FIG. 2B  FIG. 2C  FIG. 2D

HARQ PROCEDURE FOR COOPERATIVE RELAY IN SIDELINK NETWORKS

BACKGROUND

Technical Field

The present disclosure generally relates to communication systems, and more particularly, to wireless, sidelink communication between user equipments (UEs) and to wireless communication between a UE and a base station.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

For example, some aspects of wireless communication include direct communication between devices, such as device-to-device (D2D), vehicle-to-everything (V2X), and the like. There exists a need for further improvements in such direct communication between devices. Improvements related to direct communication between devices may be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE which relays data (e.g., a relay UE). The UE attempts to decode sidelink data received from a source device for relay to a destination device. The UE determines a resource of a wireless channel for transmitting feedback to the source device in response to the decoding attempt, where the resource is based on a relay identifier associated with the UE.

In an aspect of the disclosure, a method, a computer-readable medium, and an apparatus are provided. The apparatus may be a wireless device, such as a UE or base station, which receives relayed data (e.g., a destination device). The wireless device attempts to decode data received from a relay UE. The wireless device determines a resource of a wireless channel for transmitting feedback to the relay UE in response to the decoding attempt, where the resource is based on a relay identifier associated with the relay UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
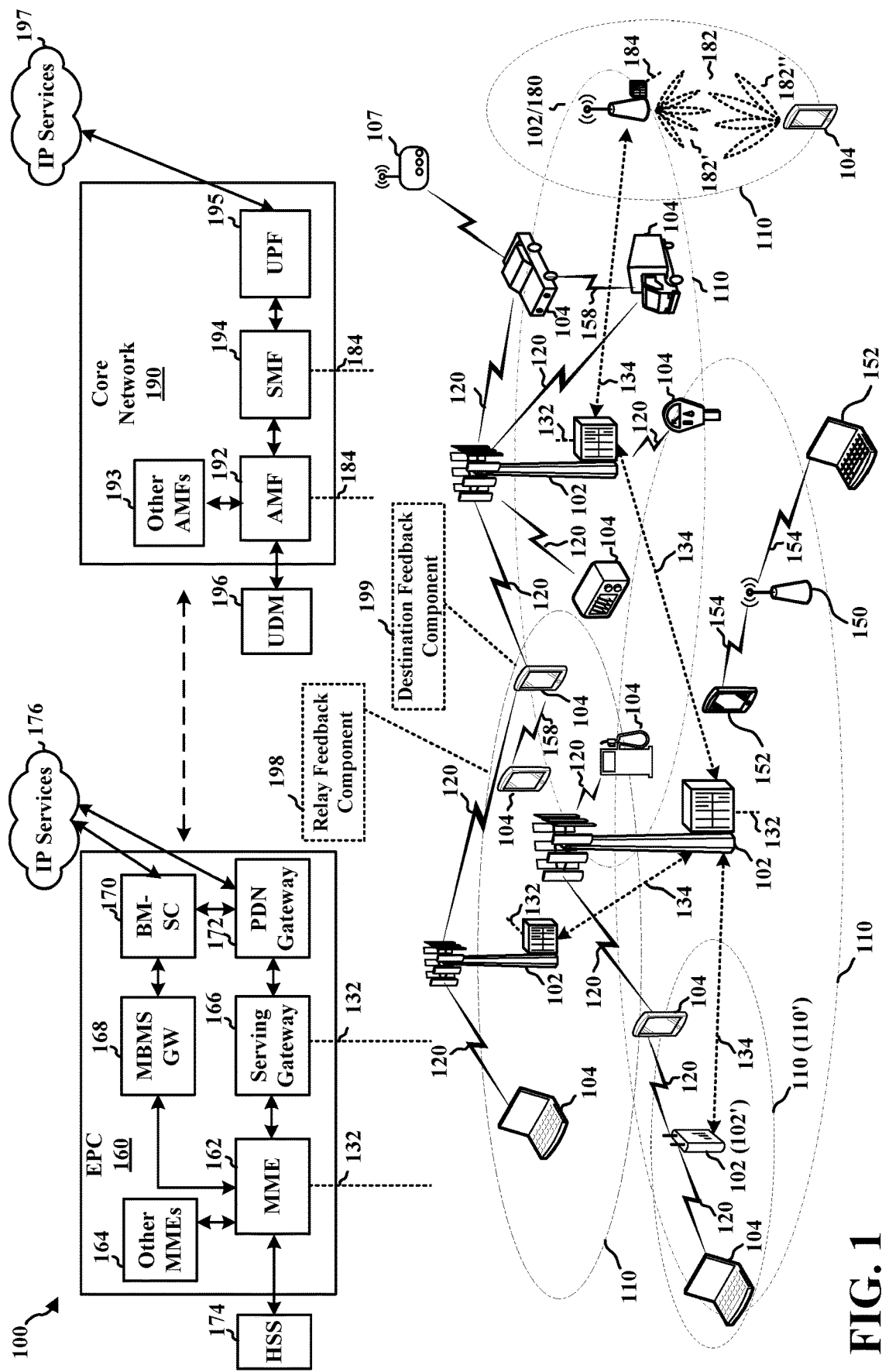
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In sidelink or other Proximity Services (ProSe) communications, a UE may relay traffic between other UEs (e.g., remote UEs) or between a remote UE and a base station. Such relay UEs provide coverage extension of sidelink, downlink, or uplink transmissions, as well as power savings for remote UEs. To set up relay operations, relay and remote UEs may request authorization from the network (e.g., a ProSe Function) to engage in direct discovery and perform sidelink or direct communications. The relay and remote UEs may then perform a relay discovery procedure, in which, for example, relay UEs may announce certain information (e.g., a ProSe application code) for other UEs to discover while remote UEs may monitor for the announced information based on a discovery filter of ProSe application codes. If the remote UEs detect any relay UEs whose announced ProSe application code(s) match the discovery filter and whose discovery message's link quality meets a reference signal received power (RSRP) threshold, the remote UEs may select the relay UE(s) for direct communication. The network may then allow selected relay UE(s) to relay sidelink communications between remote UEs (e.g., from a source UE to a destination UE), or to relay communications between the remote UEs and a base station.

Furthermore, if during relay operation setup, a source UE (or other source device) has selected multiple relay UEs for direct communication with a destination UE or a base station (or other destination device), the relay UEs may cooperate to relay sidelink data transmissions from the source device to the destination device. In cooperative relaying, the source device may send sidelink data to neighboring relay UEs simultaneously via groupcast messaging, and the relay UEs may each send the obtained sidelink data to the destination device individually via unicast messaging (e.g., using multiple-input-multiple-output (MIMO) technology). Direct communication using cooperative relaying may provide diversity and power gains as well as increased reliability and coverage compared to direct communication using a single relay. Additionally, where the destination is a base station, cooperative relaying may improve uplink data coverage for remote UEs, notwithstanding latency costs imposed by relayed transmissions over two or more hops.

However, when a source device transmits sidelink data to a destination device using cooperative relaying, any of the relays or the destination device may fail to decode the data. In such case, it would be helpful to specify HARQ feedback and retransmission procedures to address decoding failures at the relays and destination device during cooperative relaying. Aspects of the present disclosure thus provide for HARQ feedback and retransmission procedures for cooperative relaying in sidelink networks.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on V2X, V2V, or D2D communication.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some wireless communication networks may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), and/or a combination thereof and/or with other devices, which can be collectively referred to as vehicle-to-anything (V2X) communications. Referring again to FIG. 1, in certain aspects, a UE 104, e.g., a transmitting Vehicle User Equipment (VUE) or other UE, may be configured to transmit messages directly to another UE 104. The communication may be based on V2V/V2X/V2I or other D2D communication, such as Proximity Services (ProSe), etc. Communication based on V2V, V2X, V2I, and/or D2D may also be transmitted and received by other transmitting and receiving devices, such as Road Side Unit (RSU) 107, etc. Aspects of the communication may be based on PC5 or sidelink communication, e.g., as described in connection with the example in FIG. 3.

Although the present disclosure may focus on V2X/D2D or other sidelink communication in connection with 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring again to FIG. 1, in certain aspects, the UE 104 may include a relay feedback component 198 that is configured to attempt to decode sidelink data received from a source device for relay to a destination device; and determine a resource of a wireless channel for transmitting feedback to the source device in response to the decoding attempt, where the resource is based on a relay identifier associated with the UE. In other aspects, the UE 104 or base station 180 may comprise a destination feedback component 199 that is configured to attempt to decode data received from a relay UE; and determine a resource of a wireless channel for transmitting feedback to the relay UE in response to the decoding attempt, where the resource is based on a relay identifier associated with the relay UE.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where $100x$ is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgement (ACK)/non-acknowledgement (NACK) feedback. The PUSCH carries data, and may additionally be used to carry a buffer status report (BSR), a power headroom report (PHR), and/or UCI.

Figure 3:
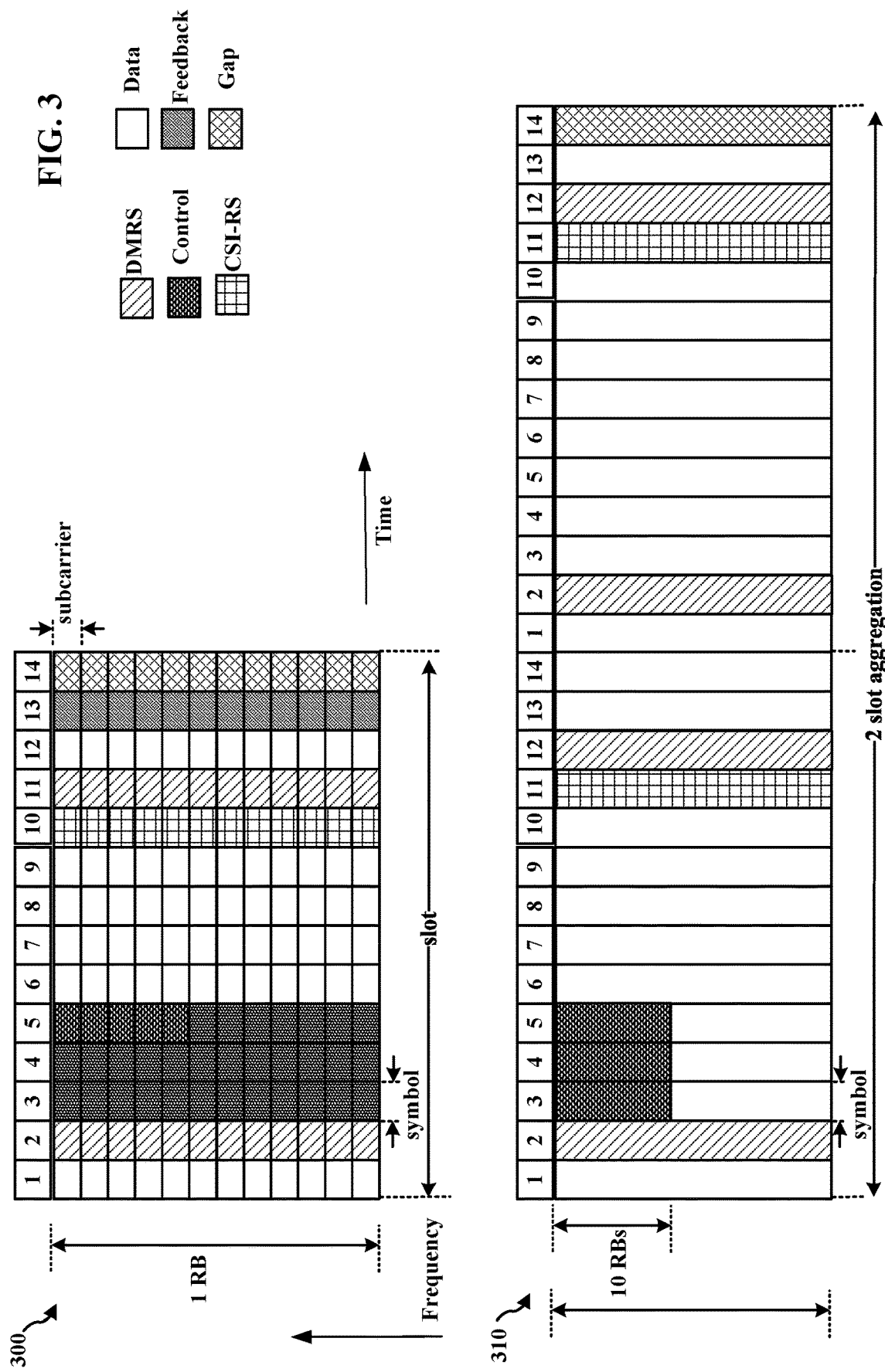
FIG. 3 illustrate example aspects of a sidelink slot structure.

FIG. 3 illustrates example diagrams 300 and 310 illustrating example slot structures that may be used for wireless communication between UE 104 and UE 104', e.g., for sidelink communication. The slot structure may be within a 5G/NR frame structure. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 300 illustrates a single slot transmission, e.g., which may correspond to a 0.5 ms transmission time interval (TTI). Diagram 310 illustrates an example two-slot aggregation, e.g., an aggregation of two 0.5 ms TTIs. Diagram 300 illustrates a single RB, whereas diagram 310 illustrates N RBs. In diagram 310, 10 RBs being used for control is merely one example. The number of RBs may differ.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 3, some of the REs may comprise control information, e.g., along with demodulation RS (DMRS). FIG. 3 also illustrates that symbol(s) may comprise CSI-RS. The symbols in FIG. 3 that are indicated for DMRS or CSI-RS indicate that the symbol comprises DMRS or CSI-RS REs. Such symbols may also comprise REs that include data. For example, if a number of ports for DMRS or CSI-RS is 1 and a comb-2 pattern is used for DMRS/CSI-RS, then half of the REs may comprise the RS and the other half of the REs may comprise data. A CSI-RS resource may start at any symbol of a slot, and may occupy 1, 2, or 4 symbols depending on a configured number of ports. CSI-RS can be periodic, semi-persistent, or aperiodic (e.g., based on DCI triggering). For time/frequency tracking, CSI-RS may be either periodic or aperiodic. CSI-RS may be transmitted in busts of two or four symbols that are spread across one or two slots. The control information may comprise Sidelink Control Information (SCI). At least one symbol may be used for feedback, as described herein. A symbol prior to and/or after the feedback may be used for turnaround between reception of data and transmission of the feedback. Although symbol 12 is illustrated for data, it may instead be a gap symbol to enable turnaround for feedback in symbol 13. Another symbol, e.g., at the end of the slot may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 3. Multiple slots may be aggregated together. FIG. 3 also illustrates an example aggregation of two slot. The aggregated number of slots may also be larger than two. When slots are aggregated, the symbols used for feedback and/or a gap symbol may be different that for a single slot. While feedback is not illustrated for the aggregated example, symbol(s) in a multiple slot aggregation may also be allocated for feedback, as illustrated in the one slot example.

Figure 4:
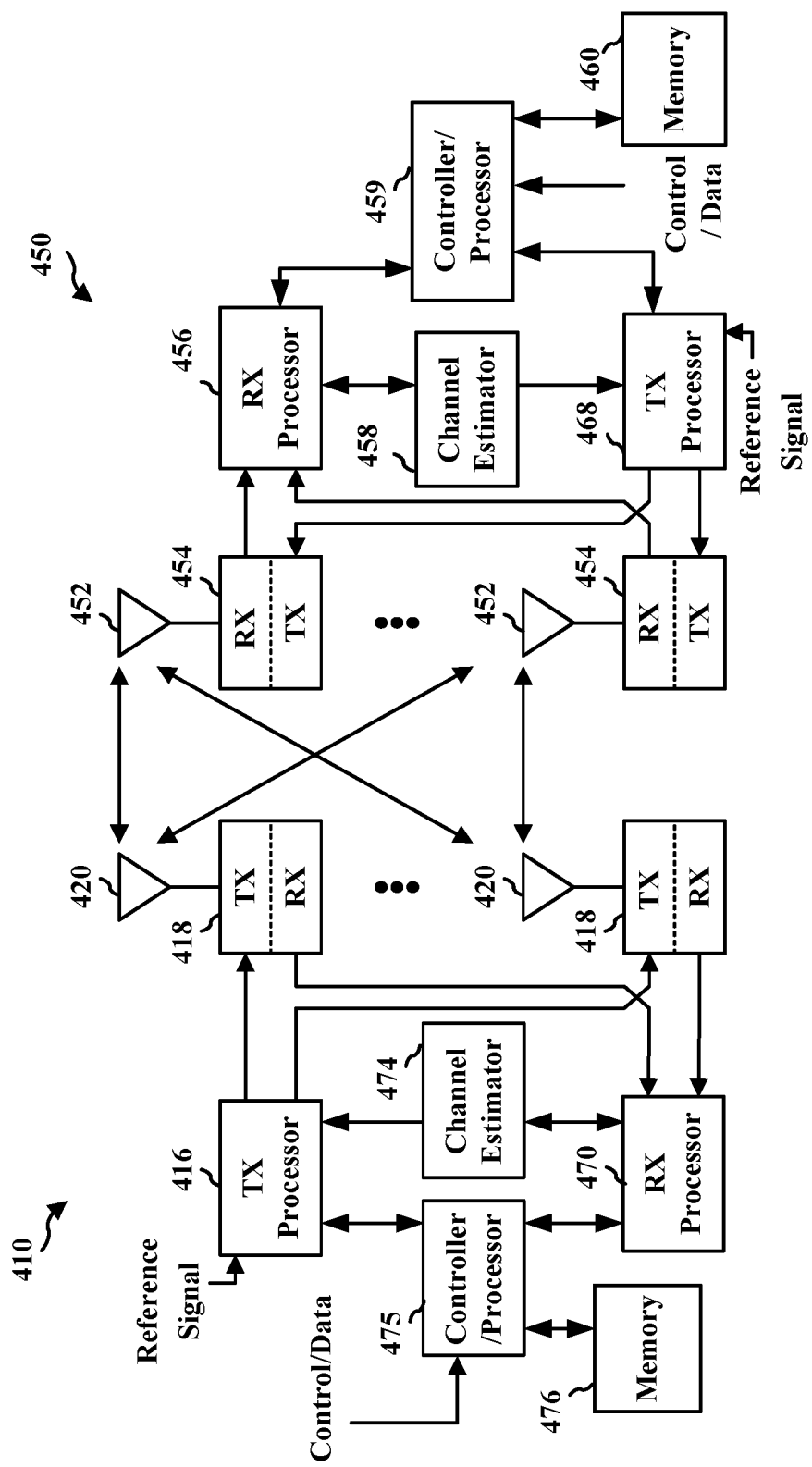
FIG. 4 is a diagram illustrating an example of a first device and a second device involved in wireless communication based, e.g., on sidelink communication.

FIG. 4 is a block diagram of a first wireless communication device 410 in communication with a second wireless communication device 450, e.g., via V2V/V2X/D2D communication or in an access network. The device 410 may comprise a transmitting device communicating with a receiving device, e.g., device 450, via V2V/V2X/D2D communication. The communication may be based, e.g., on sidelink. The transmitting device 410 may comprise a UE, an RSU, etc. The receiving device may comprise a UE, a base station, an RSU, etc.

IP packets from the EPC 160 may be provided to a controller/processor 475. The controller/processor 475 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 475 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 416 and the receive (RX) processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the device 450. Each spatial stream may then be provided to a different antenna 420 via a separate transmitter 418TX. Each transmitter 418TX may modulate an RF carrier with a respective spatial stream for transmission.

At the device 450, each receiver 454RX receives a signal through its respective antenna 452. Each receiver 454RX recovers information modulated onto an RF carrier and provides the information to the receive (RX) processor 456.

The TX processor 468 and the RX processor 456 implement layer 1 functionality associated with various signal processing functions. The RX processor 456 may perform spatial processing on the information to recover any spatial streams destined for the device 450. If multiple spatial streams are destined for the device 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the device 410. These soft decisions may be based on channel estimates computed by the channel estimator 458. The soft decisions are then decoded and deinterleaved to recover the data and control signals that were originally transmitted by the device 410 on the physical channel. The data and control signals are then provided to the controller/processor 459, which implements layer 3 and layer 2 functionality.

The controller/processor 459 can be associated with a memory 460 that stores program codes and data. The memory 460 may be referred to as a computer-readable medium. The controller/processor 459 provides demultiplexing between transport and logical channels, packet reassembly, deciphering, header decompression, and control signal processing to recover IP packets from the EPC 160. The controller/processor 459 is also responsible for error detection using an ACK and/or NACK protocol to support HARQ operations.

Similar to the functionality described in connection with the DL transmission by the device 410, the controller/processor 459 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by device 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The transmission is processed at the device 410 in a manner similar to that described in connection with the receiver function at the device 450. Each receiver 418RX receives a signal through its respective antenna 420. Each receiver 418RX recovers information modulated onto an RF carrier and provides the information to a RX processor 470.

The controller/processor 475 can be associated with a memory 476 that stores program codes and data. The memory 476 may be referred to as a computer-readable medium. The controller/processor 475 provides demultiplexing between transport and logical channels, packet reassembly, deciphering, header decompression, control signal processing to recover IP packets from the device 450. IP packets from the controller/processor 475 may be provided to the EPC 160. The controller/processor 475 is also responsible for error detection using an ACK and/or NACK protocol to support HARQ operations.

At least one of the TX processor 468, the RX processor 456, or the controller/processor 459 of device 450 or the TX 416, the RX processor 470, or the controller/processor 475 of device 410 may be configured to perform aspects described in connection with relay feedback component 198 of FIG. 1.

At least one of the TX processor 468, the RX processor 456, or the controller/processor 459 of device 450 or the TX 416, the RX processor 470, or the controller/processor 475 of device 410 may be configured to perform aspects described in connection with destination feedback component 199 of FIG. 1.

Generally, in sidelink communications, first wireless communication device 410 (e.g., a transmitting UE) initially achieves sidelink synchronization with second wireless communication device 450 (e.g., a receiving UE). Following synchronization, the transmitting UE may obtain an allocation of time-frequency resources, e.g., one or more slots, symbols, RBs, or sub-channels in a resource pool, in which to transmit sidelink data to the receiving UE. One sub-channel includes at least 4, 10, or some other number of consecutive, non-overlapping RBs. Typically, the resource allocation may be scheduled by a base station in downlink control information (DCI), or the resource allocation may be determined through a sensing procedure conducted autonomously by the transmitting UE. After determining the resources, the transmitting UE may send sidelink control information (SCI) including the resource allocation in a physical sidelink control channel (PSCCH) to the receiving UE. The transmitting UE may transmit the SCI in two stages, including a first-stage SCI carried on PSCCH, and a second-stage SCI carried on a physical sidelink shared channel (PSSCH). The first-stage SCI may contain information about the resource allocation, while the second-stage SCI may carry information for identifying and decoding the sidelink data (e.g., a modulation and coding scheme (MCS)). The transmitting UE may transmit the sidelink data in the PSSCH to the receiving UE in the allocated resources.

Upon receiving the sidelink data, the receiving UE may attempt to decode the sidelink data. For example, the receiving UE may demodulate the sidelink data (e.g., based on a MCS in the SCI) and compute log likelihood ratios (LLRs) of the bits of the demodulated sidelink data. A LLR reflects the probability of a certain bit being 1 or 0. For example, a LLR may correspond to a logarithm of a ratio of the probability of a certain bit being a '1' to that of it being a '0', where positive LLR values may represent the bit likely being a '1', negative LLR values may represent the bit likely being a '0', and a zero LLR value may represent the bit equally likely being either a '1' or a '0'. Depending on the values of the LLRs, the receiving UE may or may not be able to decode the sidelink data transmission. For instance, LLRs values of zero or approximately zero may indicate uncertainty as to the value of each bit in a sidelink data transmission and thus result in a failure to decode, while positive or negative LLR values (e.g., of or approximately ±128 or some other value) may indicate probable certainty as to the value of each bit in the sidelink data transmission and thus result in successful decoding.

Depending on the decoding result, second wireless communication device 450 (e.g., the PSSCH receiving UE) may provide hybrid automatic repeat request (HARQ) acknowledgment/negative acknowledgment (ACK/NACK) feedback to first wireless communication device 410 (e.g., the PSSCH transmitting UE). The PSSCH receiving UE may provide the HARQ ACK/NACK feedback in a physical sidelink feedback channel (PSFCH). For example, if the PSSCH receiving UE failed to decode the sidelink data in response to the computed LLRs, the UE may provide NACK to the PSSCH transmitting UE, while if the PSSCH receiving UE successfully decoded the sidelink data in response to the computed LLRs, the UE may provide ACK to the PSSCH transmitting UE. If the PSSCH transmitting UE receives NACK from the PSSCH receiving UE, the PSSCH transmitting UE may retransmit the sidelink data. In response to receiving the sidelink data retransmission, the PSSCH receiving UE may apply a HARQ combining procedure, in which the PSSCH receiving UE may combine the LLRs of the retransmitted data with the previous LLRs of the originally transmitted sidelink data in attempt to successfully decode the sidelink data.

Figure 5:
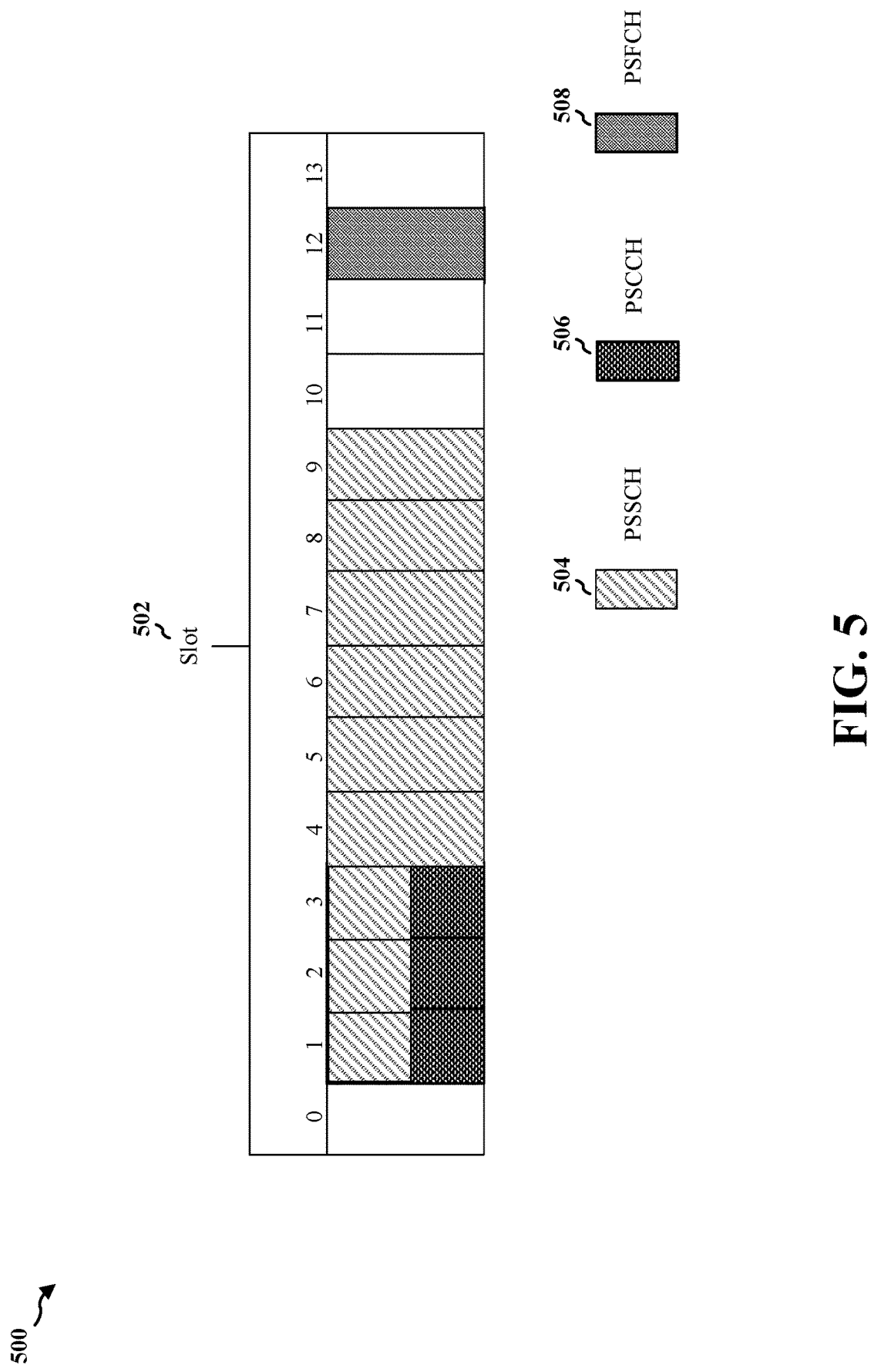
FIG. 5 is a diagram illustrating an example of a slot carrying sidelink data.

FIG. 5 illustrates an example 500 of a slot 502 carrying sidelink data in PSSCH 504 from a transmitting UE to a receiving UE. In addition to the PSSCH 504, slot 502 may include a PSCCH 506 carrying a first-stage SCI, and a PSFCH 508 for carrying HARQ feedback (ACK/NACK) from the receiving UE. The slot may also include other data besides the information carried in PSSCH 504, PSCCH 506, and PSFCH 508, including, for example, DMRS and guard periods. The PSCCH 506 may be multiplexed with the PSSCH 504 in various time-frequency resources within slot 502. While FIG. 5 illustrates a particular example slot format for PSSCH including a 3-symbol PSCCH and a 1-symbol PSFCH, in other examples, the slot format may include a different configuration for PSSCH, PSCCH, and PSFCH (e.g., number of symbols, RBs, etc.).

Furthermore, in sidelink or other ProSe communications, a UE may relay traffic between other UEs (e.g., remote UEs) or between a remote UE and a base station. Such relay UEs provide coverage extension of sidelink, downlink, or uplink transmissions, as well as power savings for remote UEs. To set up relay operations, relay and remote UEs may request authorization from the network (e.g., a ProSe Function) to engage in direct discovery and perform sidelink or direct communications. In one example of a relay discovery procedure, upon receiving authorization from the network, relay UEs may send a discovery request to the network to announce certain information (e.g., a ProSe application code) for other UEs to discover. If the request is successful, the network may provide the ProSe application code(s) to the relay UEs to announce in discovery messages to remote UEs. Similarly, upon receiving authorization from the network, remote UEs may send a discovery request to the network to monitor for the announced information. If the request is successful, the network may provide a discovery filter consisting of ProSe application codes to the remote UEs, in response to which the remote UEs may monitor for the ProSe application codes. If the remote UEs detect any relay UEs whose announced ProSe application code(s) match the filter and whose discovery message's link quality meets a RSRP threshold, the remote UEs may select the relay UE(s) for direct communication and report the code(s) to the network.

Upon completion of the relay discovery procedure, the network may allow selected relay UE(s) to relay sidelink communications between remote UEs (e.g., from a source UE to a destination UE), or to relay communications between a base station and one or more remote UEs. For example, after a source UE obtains a resource allocation in DCI or through autonomous sensing as described above, the source UE may transmit sidelink data in its allocated resources to the relay UE in a first hop. Similarly, after receiving the sidelink data from the source UE, the relay UE may transmit the sidelink data in allocated resources to a destination UE in a second hop. The source, relay, and destination UEs may determine the origin and target of sidelink data in a corresponding hop based on UE identifiers obtained during the relay discovery procedure. Such identifiers may include, for instance, a ProSe UE ID for one-to-one direct communications or one-to-many direct communications, a ProSe layer-2 group ID for one-to-many direct communications, and a ProSe Relay UE ID which may be associated with a Relay Service Code identifying a connectivity service the relay UE may provide for certain applications (e.g., Public Safety applications).

Furthermore, if during relay operation setup, a source device (e.g., a source UE) has selected multiple relay UEs for direct communication with a destination device (e.g., a destination UE or a base station), the relay UEs may cooperate to relay sidelink data transmissions from the source device to the destination device. In cooperative relaying, the source device may send sidelink data to neighboring relay UEs simultaneously via groupcast messaging, and the relay UEs may each send the obtained sidelink data to the destination device individually via unicast messaging (e.g., using MIMO technology). Direct communication using cooperative relaying may provide diversity and power gains as well as increased reliability and coverage compared to direct communication using a single relay. Additionally, where the destination is a base station, cooperative relaying may improve uplink data coverage for remote UEs, notwithstanding latency costs imposed by relayed transmissions over two or more hops.

Cooperative relaying may be synchronous or asynchronous. In synchronous cooperative relaying, relay UEs may send sidelink data in the same time and frequency resources, while in asynchronous cooperative relaying, relay UEs may send sidelink data in different time and frequency resources. For instance, the relay UEs may transmit data to the destination device in the same slot(s), symbols, and frequency resources (e.g., RBs) in synchronous cooperative relaying, while the relay UEs may transmit data to the destination device in different slot(s), symbols, and RBs in asynchronous cooperative relaying. The source, destination, and relay UEs may determine whether synchronous or asynchronous cooperative relaying applies in response to a configuration received from the network, e.g., during or after relay operation setup, which indicates the cooperative relay scheme.

In synchronous cooperative relaying, the source device may determine and indicate relay time-frequency resources, including the same slot(s), symbols, and RBs in which the relays are to transmit sidelink data in PSSCH, in the second-stage SCI for the groupcast PSSCH or in a header of a medium access control (MAC) control element (MAC-CE) carrying the groupcast PSSCH. The source device may also provide to the relay UEs a common virtual relay ID associated with the relay UEs. For example, the source device may indicate a common virtual relay ID for the relay link between the relay UEs and the source device in either the second-stage SCI or in the MAC-CE carrying the groupcast PSSCH. The common virtual relay ID may be created or obtained from the network by the source device and is different from the physical relay IDs obtained during discovery (e.g., the ProSe Relay UE ID). Upon receiving the sidelink data, the relay time-frequency resources, and the common virtual relay ID from the source device, each of the relay UEs may transmit via unicast messaging the sidelink data to the destination device in the indicated relay time-frequency resources (e.g., in the same slot(s), symbols and RBs). Each of the relay UEs may also transmit its common virtual relay ID in the second-stage SCI of its unicast PSSCH. As a result, when the destination device receives the simultaneous, unicast data transmissions, the destination device may treat the data transmissions as originating from a single, virtual relay and accordingly receive one of the data transmissions while disregarding the other transmissions.

Similarly, in asynchronous cooperative relay, the source device may determine and indicate separate, relay time-frequency resources for each relay UE, including the different slot(s), symbols, and RBs in which the relays are to respectively transmit sidelink data in PSSCH, in the second-stage SCI for the groupcast PSSCH or in a header of a MAC-CE carrying the groupcast PSSCH. In addition, before sending the groupcast PSSCH, the source device may indicate all configured relay time-frequency resources to one of the relay UEs (e.g., a relay UE scheduled to transmit unicast PSSCH earliest in time), which in turn may forward all of the resource allocations to the destination device so that the device may subsequently decode the separate data transmissions from the various relays. Additionally, unlike synchronous cooperative relaying where the source provides a common virtual relay ID, in asynchronous cooperative relaying the source device may not provide physical relay IDs associated with the relay link, since the relay UEs and destination device generally obtain this information during the discovery process (e.g., the ProSe Relay UE ID of each relay UE). Alternatively, in some cases, the source device may indicate the physical relay IDs to the relay UEs in the second-stage SCI for the groupcast PSSCH or in the MAC-CE carrying the groupcast PSSCH. Afterwards, upon receiving the sidelink data, the different relay time-frequency resources, and in some cases the respective physical relay ID from the source device, each of the relay UEs may transmit via unicast messaging the sidelink data to the destination device in its indicated relay time-frequency resources (e.g., in the separate slot(s), symbols and RBs). In some cases, each of the relay UEs may also transmit its respective physical relay ID in the second-stage SCI of its unicast PSSCH. After the destination device receives the separate data transmission from each of the relay UEs, the destination device may decode the sidelink data, e.g., by HARQ combining LLRs of the individually relayed data transmissions.

Figure 6:
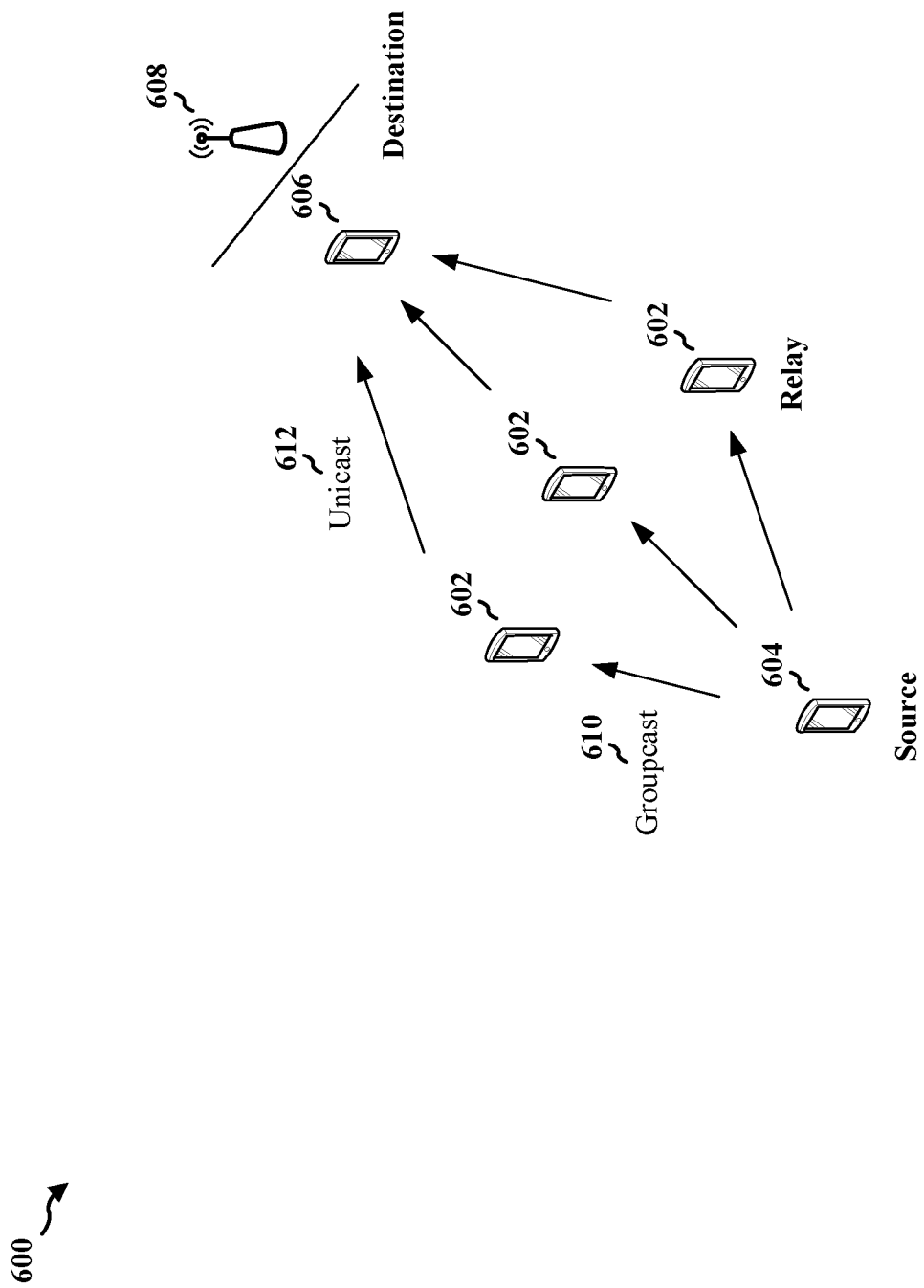
FIG. 6 is a diagram illustrating an example of cooperative relaying.

FIG. 6 illustrates an example of cooperative relaying by relay UEs 602 of sidelink communications between a source device (e.g., source UE 604) and a destination device (e.g., destination UE 606 or base station 608). In the illustrated example, source UE 604 has discovered and selected three relay UEs during a ProSe discovery procedure, although a different number of relay UEs may be discovered and selected in other examples. Initially, source UE 604 may provide a groupcast message 610 (e.g., a groupcast PSSCH carrying sidelink data) to relay UEs 602. In synchronous cooperative relaying, the groupcast message 610 may include in second-stage SCI or a MAC-CE a resource allocation of identical relay time-frequency resources for the relay UEs to transmit unicast messages 612 (e.g., a unicast PSSCH carrying sidelink data) to the destination device, and the relay UEs 602 may accordingly transmit their unicast messages in the same slot(s), symbols, and RBs indicated by the relay time-frequency resources. In synchronous cooperative relay, the groupcast message 610 may also include a common virtual relay ID associated with relay UEs 602 in the second-stage SCI or MAC-CE, and the unicast messages 612 may each include the common virtual relay ID in second-stage SCI. In asynchronous cooperative relay, the groupcast message 610 may include in second-stage SCI or a MAC-CE a resource allocation of separate relay-time frequency resources for the relay UEs to respectively transmit the unicast messages 612 to the destination device, and the relay UEs 602 may accordingly transmit their unicast messages in different slot(s), symbols, and RBs indicated by the relay time-frequency resources. In asynchronous cooperative relay, the source UE 604 may also provide a unicast message to one of the relay UEs 602, prior to groupcast message 610, indicating the aforementioned relay resource allocations, and that relay UE 602 may provide this unicast message to the destination device to assist the destination device in later decoding unicast messages 612. After the destination device receives the unicast messages 612, in synchronous cooperative relaying, the destination device may treat the data transmissions as originating from a single, virtual relay and accordingly receive one of the data transmissions while disregarding the others, while in asynchronous cooperative relaying, the destination device may decode the sidelink data by HARQ combining LLRs of the unicast messages 612.

However, even when a source device transmits sidelink data to a destination device using cooperative relaying as described above, any of the relays or the destination device may still fail to decode the data. For example, a relay or destination device may still compute LLR values which indicate uncertainty as to the value of each bit in a sidelink data transmission. In such case, it would be helpful to specify HARQ feedback and retransmission procedures to address decoding failures at the relays or destination device from cooperative relaying. Aspects of the present disclosure thus provide for HARQ feedback and retransmission procedures for cooperative relaying in sidelink networks.

Figure 7:
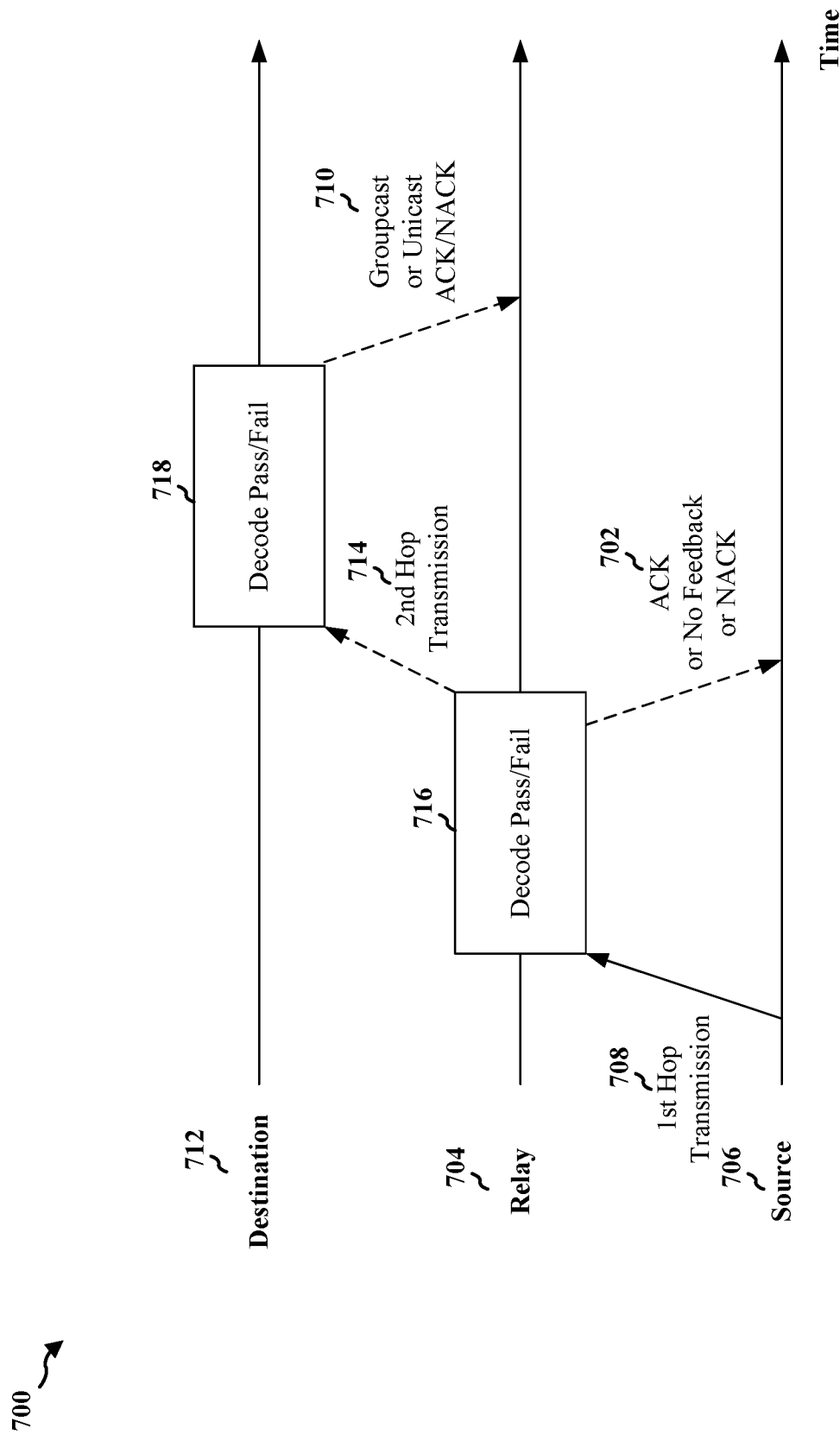
FIG. 7 is a diagram illustrating an example of wireless communication between source, relay, and destination devices.

FIG. 7 illustrates an example 700 of HARQ feedback 702 from a relay 704 to a source 706 in response to a first hop transmission 708 from source 706, and of HARQ feedback 710 from a destination 712 to relay 704 in response to a second hop transmission 714 from relay 704. Relay 704 may correspond to relay UE 602, source 706 may correspond to source UE 604, first hop transmission 708 may correspond to groupcast message 610, destination 712 may correspond to destination UE 606 or base station 608, and second hop transmission 714 may correspond to unicast message 612.

At 716, with respect to the first hop (e.g., source to relay), the relay 704 may fail to decode a groupcast transport block (e.g., first hop transmission 708 including PSSCH) from the source 706. In such case, the relay may not transmit its second hop transmission 714 to the destination 712, and any HARQ feedback 702 the relay may provide to the source 706 depends on whether synchronous cooperative relaying or asynchronous cooperative relaying is applied. In synchronous cooperative relaying, the relay 704 may provide ACK-only feedback, while in asynchronous cooperative relaying, the relay 704 may provide ACK/NACK feedback. Therefore the relay 704 may not provide NACK feedback in response to a decoding failure at 716 in synchronous cooperative relaying, but the relay may provide NACK feedback in response to a decoding failure at 716 in asynchronous cooperative relaying. On the other hand, the relay may provide ACK feedback in response to a decoding success at 716 in both synchronous and asynchronous cooperative relaying.

In synchronous cooperative relaying, relays 704 may provide ACK-only feedback on a shared PSFCH resource (e.g., a same slot, symbol(s), RB(s), or sub-channel(s)) among all relays. For example, referring to FIG. 5, each relay UE may multiplex its own HARQ feedback (ACK) in PSFCH 508 with HARQ feedback from the other relay UEs in the same time-frequency resources. The relay may derive the shared PSFCH resource based on the PSSCH resource in first hop transmission 708, e.g., the time or frequency resources carrying the PSSCH in groupcast message 610. For example, the time-frequency resources of PSFCH 508 may be a function of the time-frequency resources of PSSCH 504, where the PSSCH resources are indicated in first-stage SCI in PSCCH 506. Furthermore, the relay 704 may derive the shared PSFCH resource based on an identifier of the source 706. For example, the time-frequency resources of PSFCH 508 may be a function of a layer-1 identifier of the source UE 604, or of the ProSe UE ID of the source UE. Additionally, the relay 704 may derive the shared PSFCH resource based on the common virtual relay ID associated with the relays. For example, the time-frequency resources of PSFCH 508 may be a function of the common virtual relay ID which the relay UE 602 obtains from the source UE 604 in the PSSCH 504 within second stage SCI or in a MAC-CE. The shared PSFCH resource may be a function of any or all of these various factors.

In asynchronous cooperative relay, relays 704 may provide ACK/NACK feedback on separate PSFCH resources (e.g., a different slot, symbol(s), RB(s), or sub-channel(s)) configured for each relay. For example, referring to FIG. 5, each relay UE may transmit its own HARQ feedback (ACK/NACK) in PSFCH 508 in different time-frequency resources from the other relay UEs. Each relay 704 may derive its PSFCH resource based on the PSSCH resource in first hop transmission 708 (e.g., the time-frequency resources of PSSCH 504 in groupcast message 610) and based on an identifier of the source 706 (e.g., the layer-1 identifier or ProSe UE ID of the source UE 604). Additionally, the relay 704 may derive its PSFCH resource based on its physical relay ID. For example, the time-frequency resources of PSFCH 508 may be a function of the ProSe Relay UE ID. The separate PSFCH resource for each relay may be a function of any or all of these various factors.

The source 706 may retransmit the sidelink data in first hop transmission 708 to the relays 704 if all of the relays effectively provide NACK feedback. For example, in synchronous cooperative relaying where relay UEs may provide ACK-only feedback, the source UE 604 may retransmit groupcast message 610 to the relay UEs 602 if no HARQ feedback is received (e.g., no ACK). Alternatively, in asynchronous cooperative relaying where relay UEs may provide ACK/NACK feedback, the source UE may retransmit groupcast message 610 to the relay UEs 602 if only NACK feedback is received (e.g., no ACK). On the other hand, if the source UE receives an ACK from at least one of the relay UEs 602 in response to groupcast message 610, the source UE 604 may determine at least one of the relay UEs has successfully decoded the groupcast message 610 and no further retransmissions may be sent. If any of the relays 704 successfully decode the first hop transmission 708, the relay(s) may provide second hop transmission 714 to destination 712 via unicast messaging.

At 718, with respect to the second hop (e.g., relay to destination), the destination 712 may fail to decode a unicast transport block (e.g., second hop transmission 714 including PSSCH) from the relay 704. In such case, the HARQ feedback 710 the destination may provide to the relay depends on whether synchronous cooperative relaying or asynchronous cooperative relaying is applied. In synchronous cooperative relaying, the destination 712 may provide groupcast ACK/NACK feedback, while in asynchronous cooperative relaying, the destination 712 may provide unicast ACK/NACK feedback. Thus, in synchronous cooperative relaying, the destination may provide a single, groupcast message to all relays indicating HARQ feedback in response to a decoding success or failure at 718. On the other hand, in asynchronous cooperative relaying, the destination may provide multiple unicast messages, one to each relay, indicating HARQ feedback in response to a decoding success or failure at 718.

In synchronous cooperative relaying, destination 712 may provide ACK/NACK feedback on a PSFCH resource (e.g., a slot, symbol(s), RB(s), or sub-channel(s)) simultaneously to all relays. For example, referring to FIG. 5, destination 712 may provide its HARQ feedback (ACK/NACK) for all relays in the same time-frequency resources in PSFCH 508. The destination 712 may derive the PSFCH resource based on the PSSCH resource in second hop transmission 714, e.g., the time or frequency resources carrying the PSSCH in unicast message 612. For example, the time-frequency resources of PSFCH 508 may be a function of the time-frequency resources of PSSCH 504, where the PSSCH resources are indicated in first-stage SCI in PSCCH 506. Furthermore, the destination 712 may derive the PSFCH resource based on an identifier of the destination. For example, the time-frequency resources of PSFCH 508 may be a function of a layer-1 identifier of the destination UE 606, or of the ProSe UE ID of the destination UE. Additionally, the destination 712 may derive the PSFCH resource based on the common virtual relay ID associated with the relays. For example, the time-frequency resources of PSFCH 508 may be a function of the common virtual relay ID which the destination UE 606 obtains from the relay UEs 602 in the PSSCH 504 within second stage SCI. The PSFCH resource may be a function of any or all of these various factors.

In asynchronous cooperative relaying, destination 712 may provide ACK/NACK feedback on a separate PSFCH resource (e.g., a different slot, symbol(s), RB(s), or sub-channel(s)) to each relay. For example, referring to FIG. 5, destination 712 may provide its HARQ feedback (ACK/NACK) to each relay in different time-frequency resources in PSFCH 508. The destination 712 may derive a PSFCH resource for a relay based on the PSSCH resource in second hop transmission 714 from that relay (e.g., the time-frequency resources of the PSSCH 504 in unicast message 612 from that relay UE) and based on an identifier of the destination (e.g., the layer-1 identifier or ProSe UE ID of the destination UE 606). Additionally, the destination 712 may derive the PSFCH resource for a relay based on the physical relay ID associated with that relay. For example, the separate time-frequency resources of PSFCH 508 for a corresponding relay may be a function of the ProSe Relay UE ID of that relay. The PSFCH resource corresponding to each relay may be a function of any or all of these various factors.

Thus, relays 704 may transmit sidelink data to destination 712 in respective second hop transmissions 714, and the destination 712 may provide either groupcast or unicast HARQ feedback to the relays depending on whether synchronous or asynchronous cooperative relaying is applied. While in synchronous cooperative relaying, the destination may obtain sidelink data in the same time-frequency resources from relay UEs and simultaneously transmit HARQ feedback, in asynchronous cooperative relaying, the destination may obtain sidelink data from each relay UE in different time-frequency resources and similarly provide HARQ feedback in different time-frequency resources. As a result, a relay UE in asynchronous cooperative relaying may not be able to determine whether destination 712 has successfully decoded a second hop transmission from another relay UE, and therefore that relay UE may in some cases provide a second hop transmission to the destination even after the destination has already decoded the sidelink data. Thus, synchronous cooperative relaying may be more efficient than asynchronous cooperative relaying in preventing unnecessary second hop transmissions.

Figure 8:
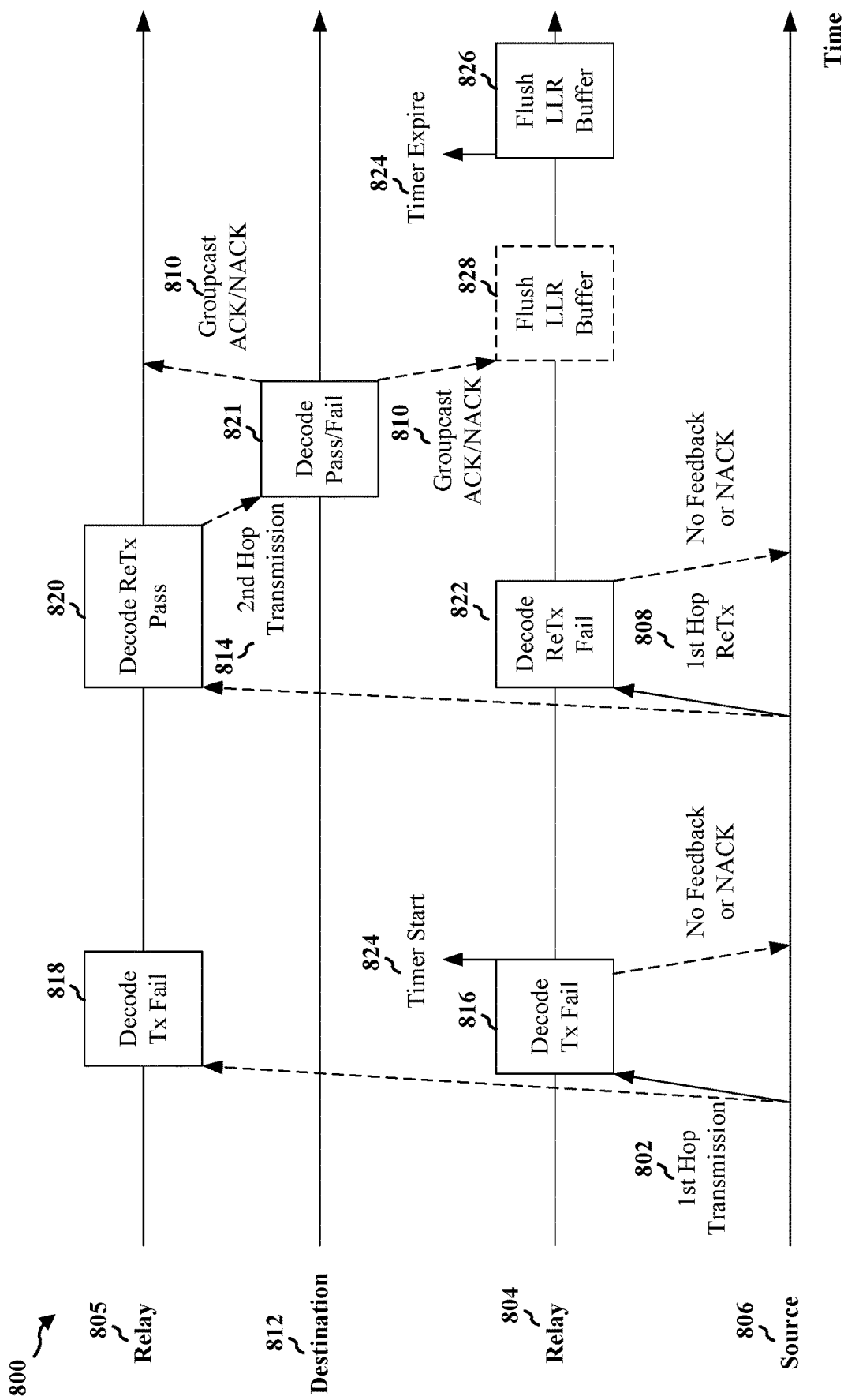
FIG. 8 is a diagram illustrating another example of wireless communication between source, relay, and destination devices.

FIG. 8 illustrates an example 800 of first hop transmissions 802 to relays 804, 805 from a source 806, and of first hop retransmissions 808 sent to the relays from the source in response to relay decoding failures of the first hop transmissions. The example of FIG. 8 also shows HARQ feedback 810 from a destination 812 to relays 804a,b in response to a second hop transmission 814 from one of the relays. Relays 804, 805 may correspond to relay UEs 602, source 806 may correspond to source UE 604, first hop transmission 802 (and first hop retransmissions 808) may correspond to groupcast message 610, destination 812 may correspond to destination UE 606 or base station 608, and second hop transmission 814 may correspond to unicast message 612.

As similarly described above with respect to FIG. 7, if any of the relays 804, 805 fail to decode first hop transmission 802 from source 806, those relays may either provide no HARQ feedback in synchronous cooperative relaying, or NACK feedback in asynchronous cooperative relaying. In such case, the source 806 may not receive at least one ACK from any of the relays 804, 805, and therefore the source may re-transmit the sidelink data to each relay in first hop retransmissions 808 (via groupcast messaging). When the relays receive the first hop retransmissions 808, the relays may apply HARQ combining in attempt to successfully decode the first hop retransmissions.

For example, at 816 and 818, respectively, each relay 804, 805 may attempt to decode first hop transmission 802 by demodulating the first hop transmission and computing LLRs of the bits for the sidelink data, but the LLRs may indicate uncertainty as to whether the bits correspond to a '1' or a '0' (e.g. a zero or approximately zero LLR value). In such case, the relays may fail to decode the sidelink data and provide no HARQ feedback or NACK feedback accordingly, causing the source to provide first hop retransmissions 808 to the relays. The relays may also store the LLRs in a buffer of memory for HARQ combining of re-transmissions. Subsequently, at 820 and 822, respectively, each relay 804, 805 may again attempt to decode the first hop retransmission 808 by demodulating the data and computing LLRs. However, here the relays may combine the LLRs of the first hop retransmission 808 with the stored LLRs of the first hop transmission 802, e.g., by adding or multiplying the LLRs together, in attempt to successfully decode the sidelink data. For example, as illustrated at 820, relay 805 may successfully decode the first hop retransmission 808 since the combined LLRs determined by that relay may more certainly indicate whether the bits of the sidelink data correspond to a '1' or a '0' (e.g., a positive or negative combined LLR value). As a result of the successful decoding, relay 805 may provide an ACK in HARQ feedback (not shown) to source 806 and proceed to provide second hop transmission 814 to the destination 812, which in turn will attempt to decode the sidelink data at 821 similarly as described above in FIG. 7.

However, in some cases, even though one of the relays (e.g., relay 805) may successfully decode a first hop transmission or retransmission as described above, another relay (e.g., relay 804) may still fail to decode the first hop transmission or retransmission. For example, at 822, relay 804 may fail to decode the first hop retransmission 808 if the combined LLRs still indicate uncertainty as to whether the bits correspond to a '1' or a '0' (e.g., a zero or approximately zero combined LLR value). In such case, relay 804 may continue to store the LLRs in the buffer of memory for HARQ combining of subsequent re-transmissions as described above. However, in this case, as source 806 has received ACK feedback from relay 805 in response to a successful decoding of the sidelink data, source 806 may no longer provide further re-transmissions to the relays. Moreover, relay 804 may not be informed that relay 805 has successfully decoded the sidelink data. As a result, the stored LLRs may unnecessarily remain in the buffer of relay 804, wasting memory.

To resolve this waste of memory, a relay 804, 805 which has failed to decode first hop transmission 802 may initiate a timer 824 during which the relay may store LLRs in its buffer. Once the timer expires, the relay flushes the LLRs from its buffer. For instance, in the example of FIG. 8, relay 804 and 805 may each start a respective timer in response to failing to decode first hop transmission at 816 and 818, respectively. For instance, the timer may be a countdown timer. Prior to expiration of the timer 824, relays 804, 805 may store LLRs of first hop retransmissions 808 in their respective buffers for HARQ combining. For example, if first hop retransmission 808 is received by relays 804, 805 prior to expiration of their respective timers, the relays may store and combine the LLRs of the first hop transmission 802 and the first hop retransmission 808 when attempting to decode the retransmission at 820 and 822, respectively. If the relay successfully decodes the sidelink data (e.g., relay 805), the relay may remove the LLRs from its buffer. If the relay fails to decode the sidelink data (e.g., relay 804), the relay may continue to store and combine LLRs of subsequent first hop transmissions received prior to expiration of timer 824. Once timer 824 expires, even if the relay has still failed to decode the sidelink data, there is a likelihood that another relay has successfully decoded the sidelink data. For instance, timer 824 may be configured (or pre-configured) to be ten slots or some other amount of time during which at least one relay will likely decode a first hop transmission or retransmission. As a result, at 826, relay 804 may flush the stored LLRs from its buffer, saving memory.

Additionally, a relay 804, 805 may flush stored LLRs from its buffer earlier than expiration of timer 824 in synchronous cooperative relaying. For example, at 828, relay 804 may flush its buffer prior to expiration of the timer in response to receiving HARQ feedback 810 (ACK/NACK) from destination 812, which destination 812 may provide at 821 in response to second hop transmission 814 from relay 805. A relay may receive HARQ feedback from destination 812 in response to another relay in synchronous cooperative relaying, since the HARQ feedback may be groupcast to each relay in the same time-frequency resources of PSFCH. The relays may determine the PSFCH resource for the destination's HARQ feedback from SCI, for example, based on the PSSCH resource and common virtual resource ID as described above. Thus, even if relay 804 fails to decode PSSCH at 816 and 822, relay 804 may still determine the PSFCH resource for the destination's HARQ feedback if relay successfully decodes PSCCH including SCI. Therefore, in synchronous cooperative relaying, a relay which decodes SCI may monitor for groupcast HARQ-feedback from destination 812 to the relays, and if the relay detects ACK/NACK feedback on the shared PSFCH resource from destination 812, the relay may flush its buffer of LLRs earlier than expiration of timer 824. Otherwise, if the relay does not detect HARQ feedback from destination 812, the relay may continue to store LLRs in its buffer until timer 824 expires.

Figure 9:
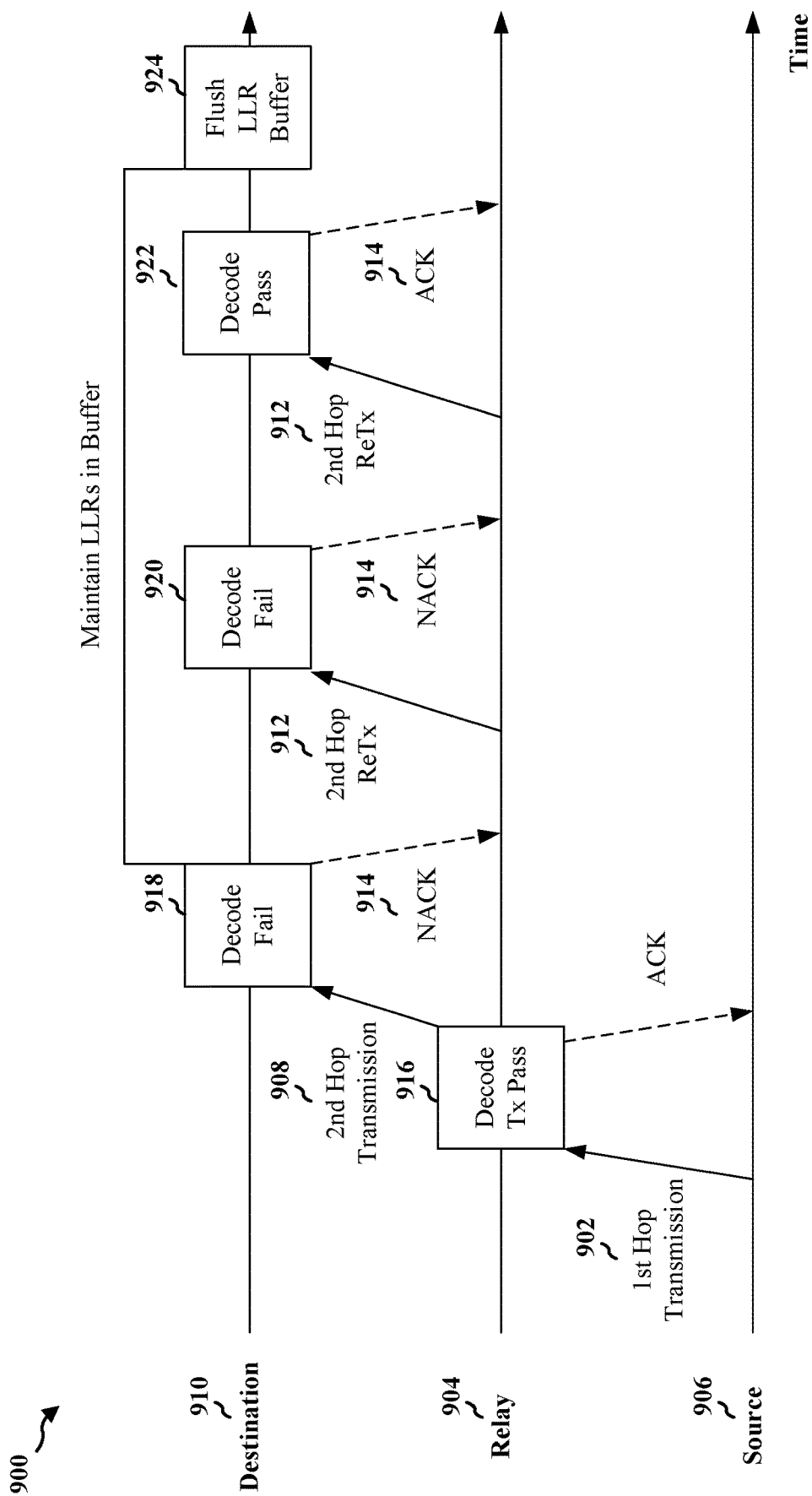
FIG. 9 is a diagram illustrating a further example of wireless communication between source, relay, and destination devices.

FIG. 9 illustrates an example 900 of a first hop transmission 902 to a relay 904 from a source 906, a second hop transmission 908 to a destination 910 from the relay, and second hop retransmissions 912 to the destination from the relay in response to destination decoding failures of the second hop transmission. The example of FIG. 9 also shows HARQ feedback 914 from destination 910 to relay 904 in response to the second hop transmission and retransmissions. Relay 904 may correspond to relay UE 602, source 906 may correspond to source UE 604, first hop transmission 902 may correspond to groupcast message 610, destination 910 may correspond to destination UE 606 or base station 608, and second hop transmission 908 (and second hop retransmissions 912) may correspond to unicast message 612.

As similarly described above with respect to FIGS. 7 and 8, if destination 910 fails to decode second hop transmission 908 from relay 904, destination may provide groupcast ACK/NACK feedback in synchronous cooperative relaying, or unicast ACK/NACK feedback in asynchronous cooperative relaying. In response to receiving NACK feedback from destination 910, relay 904 may re-transmit the sidelink data to the destination in second hop retransmissions 912 (via unicast messaging). When the destination receives the second hop retransmissions 912, the destination may apply HARQ combining in attempt to successfully decode the second hop retransmissions.

For example, at 916, relay 904 may attempt to decode first hop transmission 902 by demodulating the first hop transmission and computing LLRs for the bits of the sidelink data as described above. In this example, relay 904 has successfully decoded the first hop transmission and thus proceeds to provide second hop transmission 908 to the destination 910. Accordingly, at 918, destination 910 may attempt to decode the second hop transmission 908 by demodulating the second hop transmission and computing LLRs of the bits for the sidelink data, but the LLRs may indicate uncertainty as to whether the bits correspond to a '1' or a '0' (e.g. a zero or approximately zero LLR value). In such case, the destination may fail to decode the sidelink data and provide NACK feedback accordingly, causing the relay to provide second hop retransmission 912 to the destination. The destination may also store the LLRs in a buffer of memory for HARQ combining of re-transmissions. Subsequently, at 920, destination may again attempt to decode the second hop retransmission 912 by demodulating the data and computing LLRs. Similar to that described above for relay HARQ combining, here the destination may combine the LLRs of the second hop retransmission 912 with the stored LLRs of the second hop transmission 908, e.g., by adding or multiplying the LLRs together, in attempt to successfully decode the sidelink data. If the destination still fails to decode the data, then the destination may again provide NACK feedback, causing the relay to provide another second hop retransmission to the destination. The destination may continue to maintain the LLRs in its buffer of memory for HARQ combining. Then, at 922, the destination may again attempt to decode the second hop re-retransmission by demodulating the data, computing LLRs, and combining the LLRs with the previously stored LLRs for the second hop transmission and previous retransmission. As a result, the destination may successfully decode the second hop re-retransmission since the combined LLRs may more certainly indicate whether the bits of the sidelink data correspond to a '1' or a '0' (e.g., a positive or negative combined LLR value). As a result of the successful decoding, destination 910 may provide an ACK in HARQ feedback 914 to the relay, and at 924, the destination may flush the stored the LLRs from its buffer.

Thus, destination 910 may apply HARQ combining when attempting to decode sidelink data in second hop retransmissions 912, similar to relay 904 in attempting to decode first hop retransmissions. However, unlike the first hop transmissions and re-transmissions which are groupcast from source 906 to multiple relays, the second hop transmissions and retransmissions are unicast from the individual relays to the destination. Accordingly, when the destination 910 attempts to decode second hop transmissions or retransmissions from relays 904, the destination may compute and combine LLRs for multiple unicast transmissions.

Moreover, in synchronous cooperative relaying, the relays 904 may all transmit sidelink data in the same time-frequency resources (e.g., the same slot), while in asynchronous cooperative relaying, the relays 904 may transmit sidelink data in different time-frequency resources (e.g., different slots). Thus, the number of transmissions which are HARQ combined may depend on whether synchronized or asynchronous cooperative relaying is applied. For example, in synchronous cooperative relaying, the destination may combine LLRs across multiple transmissions or re-transmissions from a single relay (since all relays transmit in the same time-frequency resources and effectively are treated as one virtual relay). For instance, at 920, the destination may combine LLRs from one second hop retransmission 912 with previously stored LLRs from one second hop transmission 908. In contrast, in asynchronous cooperative relaying, the destination may combine LLRs across multiple transmissions or re-transmissions from multiple relays (since all relays transmit in different time-frequency resources). For instance, at 920, the destination may combine LLRs from three second hop retransmissions 912 (one from each relay) with previously stored LLRs from three second hop transmissions 908 (also one from each relay). Thus, asynchronous cooperative relaying may allow for faster decoding at the destination due to additional LLRs than synchronous cooperative relaying.

Figure 10:
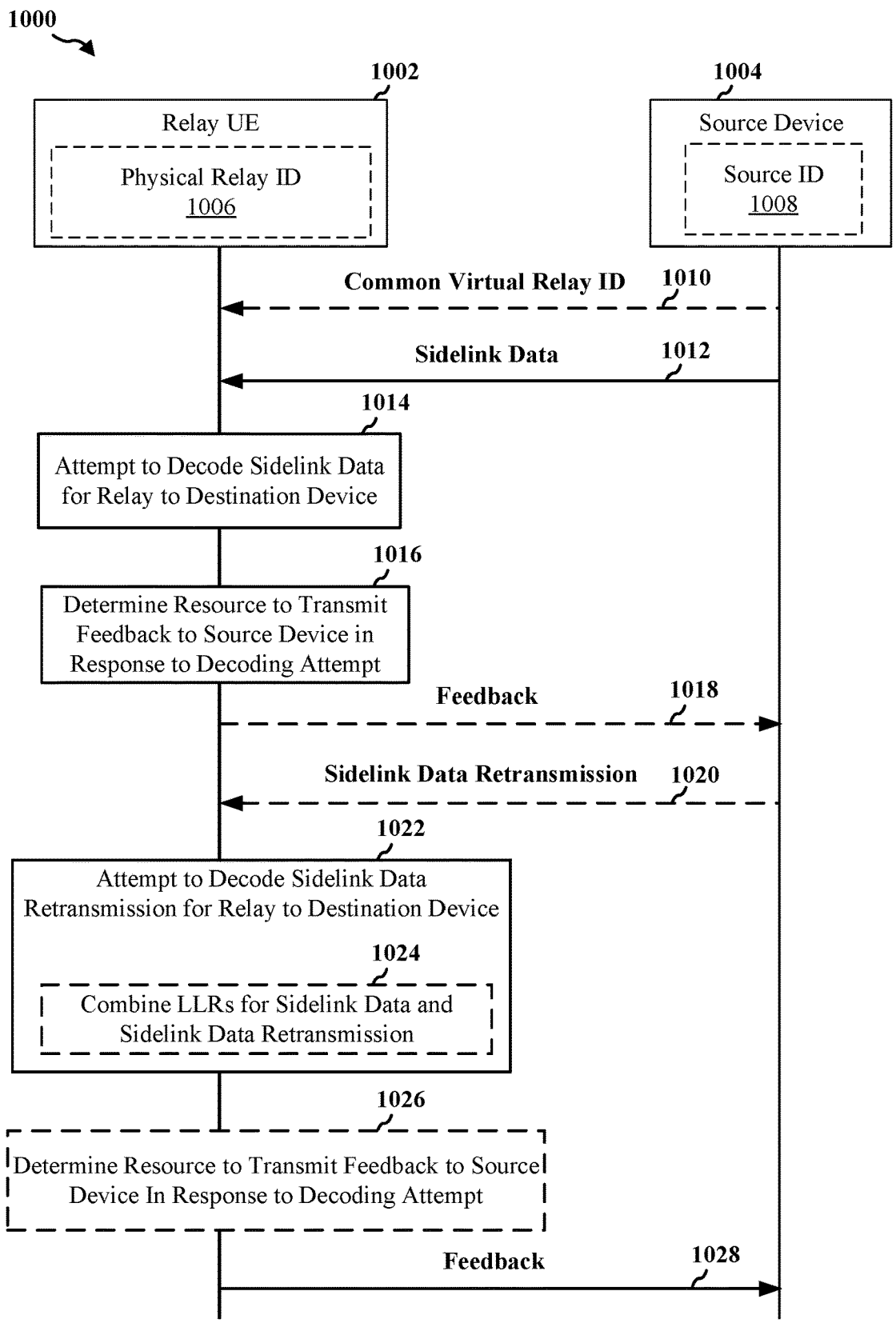
FIG. 10 is a diagram illustrating a call flow between a relay UE and a source device.

FIG. 10 illustrates an example 1000 of a call flow between a relay UE 1002 and a source device 1004. For example, relay UE 1002 may correspond to wireless communication device 450, relay UE 602 or relay 704, 804, 904, and source device 1004 may correspond to wireless communication device 410, source UE 604 or source 706, 806, 906. The relay UE may be associated with a physical relay ID 1006. For example, physical relay ID 1006 may be a relay identifier which the relay UE obtains during relay operations setup (e.g., a direct discovery procedure), such as a ProSe Relay UE ID. The source device may also be associated with a source ID 1008. For example, source ID 1008 may be a source identifier which the source device obtains during relay operations setup (e.g., a direct discovery procedure), such as a layer-1 identifier or a ProSe UE ID. Relay UE 1002 may be one of multiple relays in communication with source device 1004, such as illustrated in FIG. 6.

In synchronous cooperative relaying, the source device 1004 may provide a common virtual relay ID 1010 to relay UE 1002. For example, referring to FIG. 6, source UE 604 may transmit a groupcast message 610 including a common virtual relay ID associated with the relay UEs 602 including relay UE 1002. Referring to FIG. 5, the common virtual relay ID may be provided, for instance, in PSSCH 504 within second-stage SCI or in a MAC-CE carrying the PSSCH.

The source device 1004 may provide sidelink data 1012 to relay UE 1002. For example, referring to FIGS. 5-9, source 706, 806, 906 may provide a first hop transmission 708, 802, 902 to relay 704 including a groupcast transport block (e.g., groupcast message 610) carrying sidelink data in PSSCH 504. In addition to the sidelink data, in synchronous cooperative relaying, the groupcast message 610 may include a resource allocation of identical relay time-frequency resources for the relay UEs 602 to transmit the sidelink data in PSSCH via unicast messaging. Alternatively, in asynchronous cooperative relaying, the groupcast message 610 may include a resource allocation of separate relay-time frequency resources for the relay UEs to transmit the sidelink data in PSSCH via unicast messaging.

At 1014, the relay UE 1002 may attempt to decode the sidelink data 1012 for relay to a destination device (e.g., destination UE 606, base station 608, or destination 712, 812, 910). For instance, referring to FIGS. 5 and 6, the groupcast message 610 including the PSCCH 506 and the PSSCH 504 may include identifiers for the source device 1004 and for the destination device (e.g., ProSe UE IDs or layer-1 identifiers indicated in SCI), in response to which the relay may determine that the sidelink data is intended for relay to the destination device. Upon receiving the sidelink data, the relay UE 1002 may attempt to decode the sidelink data by demodulating the sidelink data, computing LLRs of the bits of the demodulated sidelink data, and determining whether the computed LLR values indicate the bits to be likely '1' or '0'. For example, referring to FIGS. 7-9 when the relay 704, 804, 904 attempts to decode the first hop transmission at 716, 816, 818, 916, the relay UE may fail to decode the sidelink data if the determined LLR values are zero or approximately zero, while the relay UE may successfully decode the sidelink data if the determined LLR values are positive or negative (e.g., at or approximately ±128 or some other value). If the relay fails to decode the sidelink data, the relay may store the LLRs in a buffer of memory for HARQ combining of subsequent re-transmissions.

At 1016, the relay UE 1002 determines a resource to transmit feedback to source device 1004 in response to the decoding attempt at 1014. For example, referring to FIG. 7 in synchronous cooperative relaying, relay 704 may derive a shared PSFCH resource (e.g., a same slot, symbol(s), RB(s), or sub-channel(s) for PSFCH 508 among relays) to provide ACK-only feedback to the source 706. The relay may derive the shared PSFCH resource based on the PSSCH resource in first hop transmission 708 (e.g., the time or frequency resources carrying the PSSCH in groupcast message 610), the source identifier 1008, or the common virtual relay ID 1010 associated with the relays. The shared PSFCH resource in synchronous cooperative relaying may be a function of any or all of these various factors. In another example, in asynchronous cooperative relaying, relay 704 may derive a separate PSFCH resource (e.g., a different slot, symbol(s), RB(s), or sub-channel(s) for PSFCH 508 between relays) to provide ACK/NACK feedback to the source 706. The relay 704 may derive its PSFCH resource based on the PSSCH resource in first hop transmission 708 (e.g., the time-frequency resources of PSSCH 504 in groupcast message 610), based on the source identifier 1008, or based on the physical relay ID 1006 associated with the relay. The separate PSFCH resource in asynchronous cooperative relaying may be a function of any or all of these various factors.

The relay UE 1002 may provide feedback 1018 to the source device 1004 in the resource determined at 1016. For example, referring to FIG. 7, relay 704 may provide HARQ feedback 702 to source 706 in response to the first hop transmission 708. For instance, in synchronous cooperative relaying, the relay 704 may provide ACK-only feedback in PSFCH 508, e.g., by multiplexing its own HARQ feedback with HARQ feedback from other relay UEs in the shared PSFCH resource among relay UEs. In another example, in asynchronous cooperative relaying, the relay 704 may provide ACK/NACK feedback in PSFCH 508, e.g., by transmitting its own HARQ feedback in a separate PSFCH resource from the other relay UEs. The relay may determine the shared or separate PSFCH resource as described above at 1016.

In response to receiving the feedback 1018, the source device 1004 may provide a sidelink data retransmission 1020 to the relay UE 1002. For example, referring to FIGS. 6 and 7, if source 706 does not receive ACK from relay 704 (or other relays), the source may retransmit the groupcast message 610 to the UEs including the sidelink data. For instance, referring to FIG. 8, source may re-transmit sidelink data to relays 804, 805 in first hop retransmissions 808 in response to no HARQ feedback (in synchronous cooperative relaying) or NACK feedback (in asynchronous cooperative relaying) from the relays.

Subsequently, at 1022, the relay UE 1002 may attempt to decode the sidelink data retransmission 1020 for relay to the destination device. For example, at 1024 and in attempt to decode the sidelink data retransmission, the relay UE may combine LLRs for sidelink data 1012 with LLRs for sidelink data retransmission 1020. For instance, referring to FIGS. 8, at 820 and 822, relay 804, 805 may attempt to decode first hop retransmission 808 by demodulating the first hop retransmission, computing LLRs of the bits of the demodulated data, and combining the computed LLRs with the previously stored LLRs at 1014 (e.g., by adding or multiplying the LLRs together). Thus, relay 805 may successfully decode the first hop retransmission 808 if the combined LLRs indicate that the bits of the sidelink data retransmission correspond to a '1' or a '0' (e.g., a positive or negative combined LLR value), while relay 804 may fail to decode the first hop retransmission 808 if the combined LLRs indicate uncertainty as to whether the bits correspond to a '1' or '0' (e.g., a zero or approximately zero combined LLR value).

Then, at 1026, the relay UE 1002 may determine a resource to transmit feedback to source device 1004 in response to the decoding attempt at 1022. The relay UE may determine the resource in a similar manner as described above at 1016. For example, referring to FIG. 8 in synchronous cooperative relaying, relay 804 may derive a shared PSFCH resource (e.g., a same slot, symbol(s), RB(s), or sub-channel(s) for PSFCH 508 among relays) to provide ACK-only feedback to the source 806. The relay may derive the shared PSFCH resource based on the PSSCH resource in first hop retransmission 808 (e.g., the time or frequency resources carrying the PSSCH in groupcast message 610), the source identifier 1008, or the common virtual relay ID 1010 associated with the relays. The shared PSFCH resource in synchronous cooperative relaying may be a function of any or all of these various factors. In another example, in asynchronous cooperative relaying, relay 804 may derive a separate PSFCH resource (e.g., a different slot, symbol(s), RB(s), or sub-channel(s) for PSFCH 508 between relays) to provide ACK/NACK feedback to the source 806. The relay 804 may derive its PSFCH resource based on the PSSCH resource in first hop retransmission 808 (e.g., the time-frequency resources of PSSCH 504 in groupcast message 610), based on the source identifier 1008, or based on the physical relay ID 1006 associated with the relay. The separate PSFCH resource in asynchronous cooperative relaying may be a function of any or all of these various factors.

The relay UE 1002 may then provide feedback 1028 to the source device 1004 in the resource determined at 1026. For example, referring to FIG. 8, relay 804 may provide HARQ feedback to source 806 in response to the first hop retransmission 808. For instance, in synchronous cooperative relaying, the relay 804 may provide ACK-only feedback in PSFCH 508, e.g., by multiplexing its own HARQ feedback with HARQ feedback from other relay UEs in the shared PSFCH resource among relay UEs. In another example, in asynchronous cooperative relaying, the relay 804 may provide ACK/NACK feedback in PSFCH 508, e.g., by transmitting its own HARQ feedback in a separate PSFCH resource from the other relay UEs. The relay may determine the shared or separate PSFCH resource similarly as described above at 1026.

Figure 11:
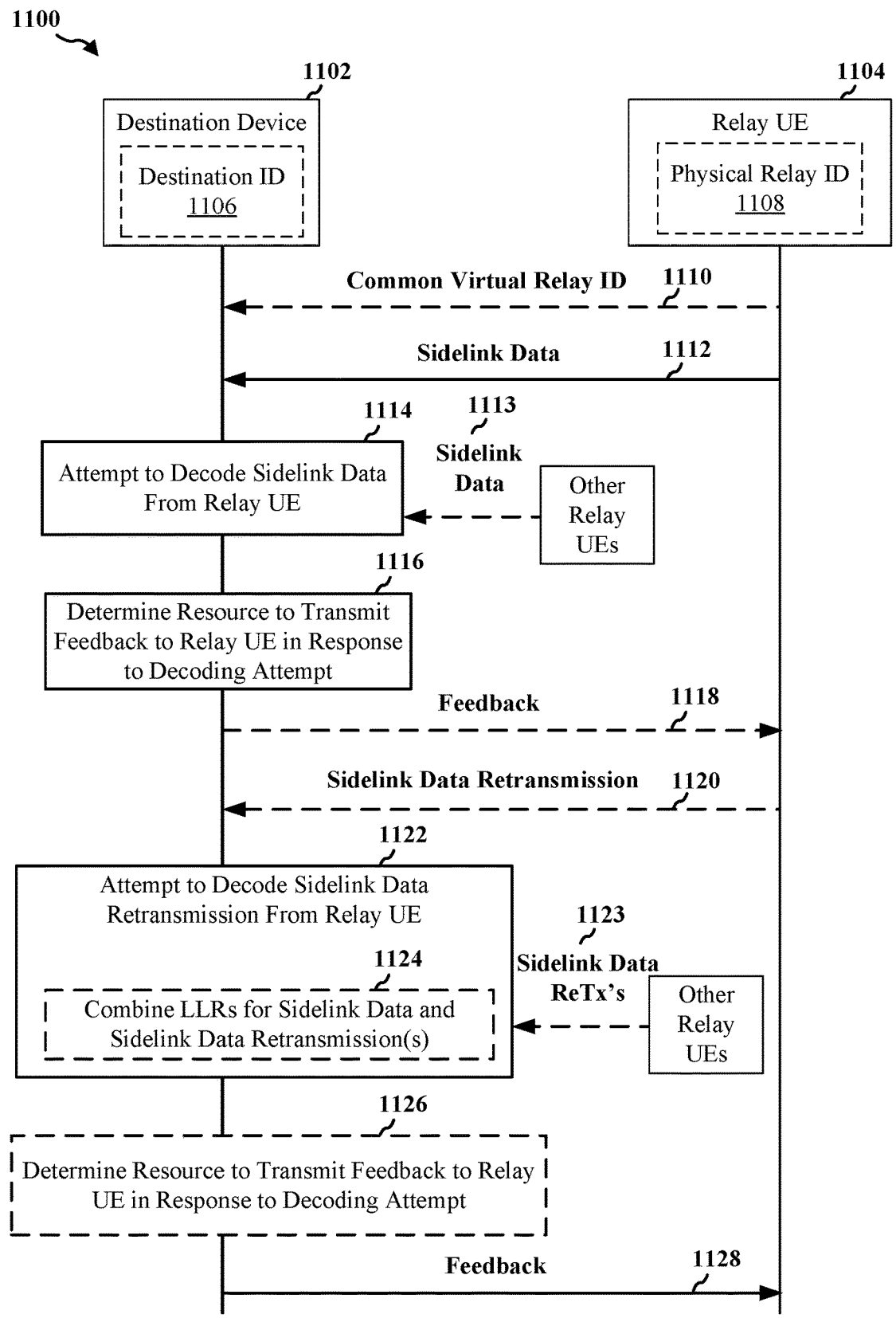
FIG. 11 is a diagram illustrating a call flow between a destination device and a relay UE.

FIG. 11 illustrates an example 1100 of a call flow between a destination device 1102 and a relay UE 1104. For example, destination device 1102 may correspond to wireless communication device 450, destination UE 606, base station 608 or destination 712, 812, 910; and relay UE 1104 may correspond to wireless communication device 410 or relay UE 1002. The destination device may be associated with a destination ID 1106. For example, destination ID 1106 may be a destination identifier which the destination device obtains during relay operations setup (e.g., a direct discovery procedure), such as a layer-1 identifier or a ProSe UE ID. The relay UE may also be associated with a physical relay ID 1108, which may correspond to physical relay ID 1006 in FIG. 10. Relay UE 1106 may be one of multiple relays in communication with destination device 1102, such as illustrated in FIG. 6.

In synchronous cooperative relaying, the relay UE 1104 may provide a common virtual relay ID 1110 to destination device 1102. The common virtual relay ID 1110 may correspond to the common virtual relay ID 1010 in FIG. 10. For example, referring to FIG. 6, each relay UE 602 including relay UE 1104 may transmit a unicast message 612 including a common virtual relay ID associated with the relay UEs 602. Referring to FIG. 5, the common virtual relay ID may be provided, for instance, in PSSCH 504 within second-stage SCI.

The relay UE 1104 may provide sidelink data 1112 to destination device 1102 (e.g., destination UE 606). For example, referring to FIGS. 5-9, relay 704, 804, 904 may provide a second hop transmission 714, 814, 908 to destination 712, 812, 910 including a unicast transport block (e.g., unicast message 612) carrying sidelink data in PSSCH 504. Alternatively, the relay UE may provide uplink data to destination device 1102 (e.g., base station 608).

At 1114, the destination device 1102 may attempt to decode the sidelink data 1112 (or uplink data) from relay UE 1104. For instance, upon receiving the sidelink data, the destination UE 606 may attempt to decode the sidelink data by demodulating the sidelink data, computing LLRs of the bits of the demodulated sidelink data, and determining whether the computed LLR values indicate the bits to be likely '1' or '0'. For example, referring to FIGS. 7-9 when the destination 712, 812, 910 attempts to decode the second hop transmission at 718, 821, 918, the destination may fail to decode the sidelink data if the determined LLR values are zero or approximately zero, while the destination may successfully decode the sidelink data if the determined LLR values are positive or negative (e.g., at or approximately ±128 or some other value). If the destination fails to decode the sidelink data, the destination may store the LLRs in a buffer of memory for HARQ combining of subsequent re-transmissions. Base station 608 may attempt to decode uplink data in a similar manner.

Moreover, at 1114, the destination device may attempt to decode sidelink data 1113 (or uplink data) received from other relay UEs than relay UE 1104, e.g., other relay UEs 602. For instance, since the destination UE 606 may receive the sidelink data 1112, 1113 from multiple relay UEs in different unicast messages, the destination UE may combine computed LLR values to improve the likelihood of decoding the sidelink data 1112, 1113 from the relay UEs. For example, after demodulating the sidelink data 1113, the destination UE may compute LLRs of the bits of the demodulated sidelink data, combine the LLRs with the previously stored LLRs for sidelink data 1112, and determine whether the combined LLRs indicate the bits to be more likely a '1' or a '0'. Base station 608 may operate similarly for uplink data.

At 1116, the destination device 1102 determines a resource to transmit feedback to relay UE 1104 and other relay UEs in response to the decoding attempt at 1114. For example, in synchronous cooperative relaying, destination UE 606 may derive a common PSFCH resource (e.g., a same slot, symbol(s), RB(s), or sub-channel(s) for PSFCH 508) to provide ACK/NACK feedback simultaneously to all relays including relay UE 1104 (via groupcast messaging). The destination UE may derive the PSFCH resource based on the PSSCH resource in second hop transmission 714 (e.g., the time or frequency resources carrying the PSSCH in unicast message 612), the destination identifier 1106, or the common virtual relay ID 1110 associated with the relay UE. The PSFCH resource in synchronous cooperative relaying may be a function of any or all of these various factors. In another example, in asynchronous cooperative relaying, destination UE 606 may derive separate PSFCH resources (e.g., a different slot, symbol(s), RB(s), or sub-channel(s) for PSFCH 508) to provide separate ACK/NACK feedback individually to all relays including relay UE 1104 (via unicast messaging). The destination UE may derive the PSFCH resource for a relay based on the corresponding PSSCH resource in second hop transmission 714 (e.g., the time-frequency resources of PSSCH 504 in unicast message 612 from the relay), the destination identifier 1106, or the physical relay ID 1108 associated with the relay. Each PSFCH resource in asynchronous cooperative relaying may be a function of any or all of these various factors. Base station 608 may similarly derive resource(s) for feedback to the relay UEs.

The destination device 1102 may provide feedback 1118 to the relay UE 1104 (and other relay UEs) in the resource determined at 1116. For example, referring to FIGS. 6 and 7, destination UE 606, 712 may provide HARQ feedback 710 to relay 704 in response to the second hop transmission 714. For instance, in synchronous cooperative relaying, the destination UE may provide groupcast ACK/NACK feedback in PSFCH 508, e.g., in the common PSFCH resource for all relays. In another example, in asynchronous cooperative relaying, the destination UE may provide unicast ACK/NACK feedback in PSFCH 508, e.g., in the separate PSFCH resource for each relay. The destination device may determine the common or separate PSFCH resources as described above at 1116. Base station 608 may similarly provide feedback to the relay UEs in derived resources as described above.

In response to receiving the feedback 1118, the relay UE 1104 may provide a sidelink data retransmission 1120 (or uplink data retransmission) to the destination device 1102. For example, referring to FIGS. 6 and 7, if relay 704 does not receive ACK from destination UE 606, 712, the relay may retransmit the unicast message 612 to the destination UE including the sidelink data. For instance, referring to FIG. 9, relay 904 may re-transmit sidelink data to destination 910 in second hop retransmissions 912 in response to groupcast HARQ feedback (in synchronous cooperative relaying) or unicast HARQ feedback (in asynchronous cooperative relaying) from the destination. Similarly, the other relay UEs may provide sidelink data retransmissions 1123 (e.g., other unicast messages 612) to destination UE 606 in response to feedback 1118. The relays may operate similarly in providing uplink data retransmissions to base station 608.

Subsequently, at 1122, the destination device 1102 may attempt to decode the sidelink data retransmission 1120 (or uplink data retransmission) from the relay UEs 1104 (and similarly the sidelink data retransmissions 1123 or uplink data retransmissions from the other relay UEs). For example, at 1124 and in attempt to decode the sidelink data retransmission, the destination UE may combine previously stored LLRs for sidelink data 1112 with computed LLRs for sidelink data retransmission 1120 from relay UE 1104. The destination UE may also combine previously stored LLRs for sidelink data 1113 with computed LLRs for sidelink data retransmissions 1123 from other relay UEs, as well as combine LLRs for such transmissions across all relay UEs. For instance, referring to FIG. 9, at 920 or 922, destination 910 may attempt to decode second hop retransmission 912 by demodulating the second hop retransmission, computing LLRs of the bits of the demodulated data, and combining the computed LLRs with the previously stored LLRs at 1114 (e.g., by adding or multiplying the LLRs together). Thus, at 922, destination 910 may successfully decode the second hop retransmission 912 if the combined LLRs indicate that the bits of the sidelink data retransmission correspond to a '1' or a '0' (e.g., a positive or negative combined LLR value), while at 920, destination 910 may fail to decode the second hop retransmission 912 if the combined LLRs indicate uncertainty as to whether the bits correspond to a '1' or '0' (e.g., a zero or approximately zero combined LLR value). Base station 608 may operate similarly in attempt to decode uplink data retransmissions.

Then, at 1126, the destination device 1102 may determine a resource to transmit feedback to relay UE 1104 in response to the decoding attempt at 1122. The destination device may determine the resource in a similar manner as described above at 1116. For example, referring to FIGS. 6 and 9 in synchronous cooperative relaying, destination UE 606, 910 may derive a common PSFCH resource (e.g., a same slot, symbol(s), RB(s), or sub-channel(s) for PSFCH 508) to provide ACK/NACK feedback to all relays including relay UE 1104 (via groupcast messaging). The destination may derive the PSFCH resource based on the PSSCH resource in second hop retransmission 912 (e.g., the time or frequency resources carrying the PSSCH in unicast message 612), the destination identifier 1106, or the common virtual relay ID 1010 associated with the relays. The PSFCH resource in synchronous cooperative relaying may be a function of any or all of these various factors. In another example, in asynchronous cooperative relaying, destination UE 606 may derive separate PSFCH resources (e.g., a different slot, symbol(s), RB(s), or sub-channel(s) for PSFCH 508) to provide separate ACK/NACK feedback individually to all relays including relay UE 1104 (via unicast messaging). The destination UE may derive the PSFCH resource for a relay based on the corresponding PSSCH resource in second hop retransmission 912 (e.g., the time-frequency resources of PSSCH 504 in unicast message 612 from the relay), the destination identifier 1106, or the physical relay ID 1108 associated with the relay. Each PSFCH resource in asynchronous cooperative relaying may be a function of any or all of these various factors. Base station 608 may similarly derive resource(s) for feedback to the relay UEs.

The destination device 1102 may then provide feedback 1128 to the relay UE 1104 (and other relay UEs) in the resource determined at 1126. For example, referring to FIGS. 6 and 9, destination UE 606, 910 may provide HARQ feedback to relay 904 in response to the second hop retransmission 912. For instance, in synchronous cooperative relaying, the destination UE may provide groupcast ACK/NACK feedback in PSFCH 508, e.g., in the common PSFCH resource for all relays. In another example, in asynchronous cooperative relaying, the destination UE may provide unicast ACK/NACK feedback in PSFCH 508, e.g., in the separate PSFCH resource for each relay. The destination device may determine the common or separate PSFCH resource similarly as described above at 1126. Base station 608 may similarly provide feedback to the relay UEs in derived resources as described above.

Figure 12:
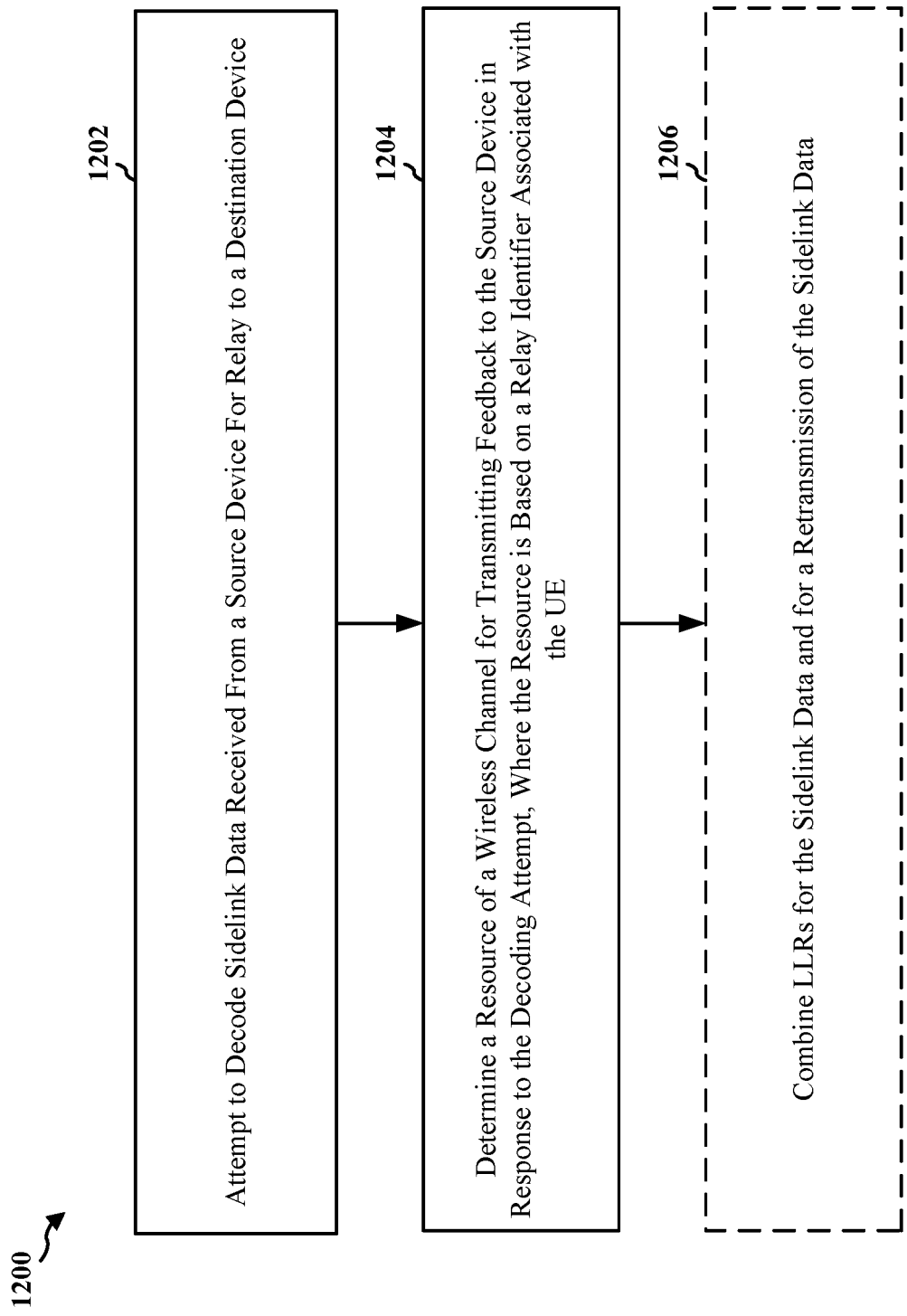
FIG. 12 is a flowchart of a method of wireless communication at a relay UE.

FIG. 12 is a flowchart 1200 of a method of wireless communication. The method may be performed by a relay UE (e.g., the UE 104, the first wireless communication device 410, the second wireless communication device 450, relay UE 602, relay 704, 804, 904, relay UE 1002, 1104; the apparatus 1402). Optional aspects are illustrated in dashed lines. The method provides for HARQ feedback and retransmission for relay UEs in cooperative relaying schemes.

At 1202, the relay UE attempts to decode sidelink data received from a source device for relay to a destination device. For example, 1202 may be performed by decode component 1440. For instance, as described above with respect to FIG. 10 at 1014, the relay UE 1002 may attempt to decode sidelink data 1012 received from source device 1004 for relay to a destination device (e.g., destination UE 606, base station 608, or destination 712, 812, 910). Similarly, as described above at 1022, the relay UE 1002 may attempt to decode sidelink data retransmission 1020 received from source device 1004 for relay to the destination device.

At 1204, the relay UE determines a resource of a wireless channel for transmitting feedback to the source device in response to the decoding attempt. For example, 1204 may be performed by resource component 1442. The wireless channel may comprise a PSFCH. For instance, as described above with respect to FIG. 10 at 1016, the relay UE 1002 may determine a resource (e.g., one or more slots, symbols, RBs, or sub-channels of PSFCH) in which to transmit feedback 1018 to the source device 1004 in response to the decoding attempt at 1014. The resource may be, e.g., a shared PSFCH resource among relays or a separate PSFCH resource between relays. Similarly, as described above at 1026, the relay UE 1002 may determine a similar resource to transmit feedback 1028 to the source device 1004 in response to the decoding attempt at 1022.

The resource is based on a relay identifier associated with the UE. In one example, the relay identifier may be a common virtual relay identifier associated with a plurality of relay UEs including the UE. In another example, the relay identifier may be a physical relay identifier associated with the UE. For instance, as described above with respect to FIG. 10, the resource (e.g., the one or more slots, symbols, RBs, or sub-channels in which feedback is transmitted) may be a function of either the common virtual relay ID 1010 associated with the relays (the relay UEs 602 including relay UE 1002 in synchronous cooperative relaying) or the physical relay ID 1006 associated with the relay UE 1002 (in asynchronous cooperative relaying).

In one example, the resource may be shared among a plurality of relay UEs including the UE. For instance, as described above with respect to FIG. 7, relay 704 may derive a shared PSFCH resource, e.g., a same slot, symbol(s), RB(s), or sub-channel(s) for PSFCH 508 among relay UEs 602, to provide ACK-only feedback to the source 706 in synchronous cooperative relaying. In such case, the relay 704 may provide ACK-only feedback in PSFCH 508, for example, by multiplexing its own HARQ feedback with HARQ feedback from other relay UEs in the shared PSFCH resource among relay UEs (e.g., in the same time-frequency resources).

In another example, the resource may be individually configured for different relay UEs including the UE. For instance, as described above with respect to FIG. 7, relay 704 may derive a separate PSFCH resource, e.g., a different slot, symbol(s), RB(s), or sub-channel(s) for PSFCH 508 between relay UEs 602, to provide ACK/NACK feedback to the source 706 in asynchronous cooperative relaying. In such case, the relay 704 may provide ACK/NACK feedback in PSFCH 508, for example, by transmitting its own HARQ feedback in its separate PSFCH resource from the other relay UEs (e.g., in different time-frequency resources).

The resource may be further based on a PSSCH resource carrying the sidelink data and an identifier of the source device. For example, as described above with respect to FIGS. 6, 7, and 10, the PSFCH resource may be a function of the PSSCH resource in first hop transmission 708 (e.g., the time or frequency resources carrying the PSSCH in groupcast message 610). Moreover, the PSFCH resource may be a function of the source identifier 1008.

At 1206, the relay UE may combine LLRs for the sidelink data and for a retransmission of the sidelink data. For example, 1206 may be performed by LLR combination component 1444. For instance, as described above with respect to FIG. 10, at 1024, and in attempt to decode the sidelink data retransmission at 1022, the relay UE 1002 may combine LLRs for sidelink data 1012 with LLRs for sidelink data retransmission 1020.

In one example, the LLRs may be flushed from a memory of the UE in response to expiration of a timer. For example, as described above with respect to FIG. 8, at 826, relay 804 may flush stored LLRs from a buffer of memory (e.g., memory 460) in response to expiration of timer 824. In another example, the LLRs may be flushed from a memory of the UE prior to expiration of a timer in response to an acknowledgment of the sidelink data from the destination device. For example, as described above with respect to FIG. 8, at 828, relay 804 may flush its buffer prior to expiration of timer 824 in response to receiving HARQ feedback 810 from destination 812.

Figure 13:
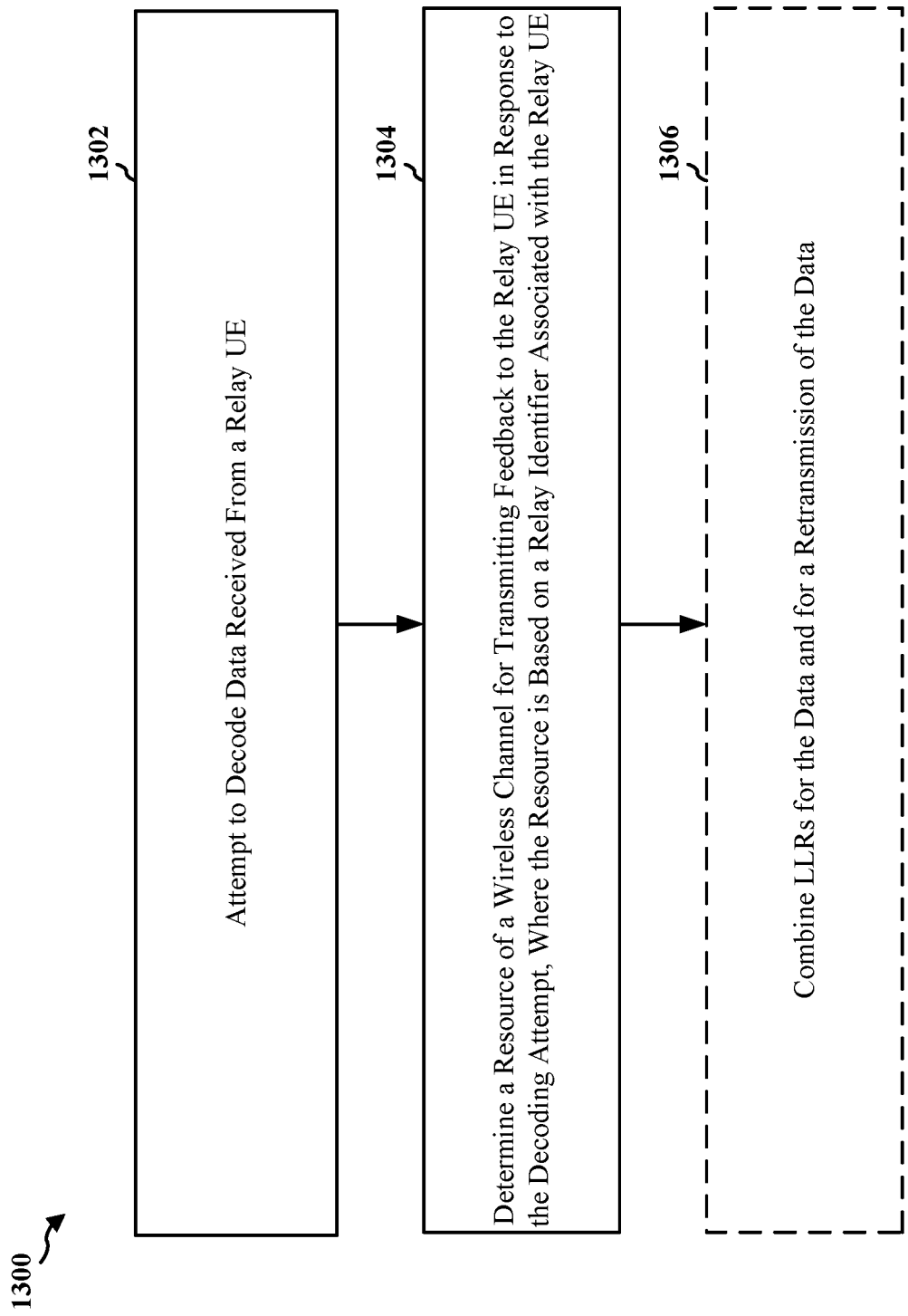
FIG. 13 is a flowchart of a method of wireless communication at a wireless device (e.g., a destination UE or base station).

FIG. 13 is a flowchart 1300 of a method of wireless communication. The method may be performed by a wireless device (e.g., the base station 102/180, UE 104, the second wireless communication device 450, destination UE 606 or base station 608, destination 712, 812, 910, destination device 1102; the apparatus 1502). Optional aspects are illustrated in dashed lines. The method provides for HARQ feedback and retransmission for destination devices in cooperative relaying schemes.

At 1302, the wireless device attempts to decode data received from a relay UE. For example, 1302 may be performed by decode component 1540. For instance, as described above with respect to FIG. 11 at 1114, the destination device 1102 may attempt to decode sidelink data 1112 (or uplink data) received from relay UE 1104. Moreover, the destination device may attempt to decode sidelink data 1113 (or uplink data) received from other relay UEs than relay UE 1104 (e.g., other relay UEs 602). Similarly, as described above at 1122, the destination device 1102 may attempt to decode sidelink data retransmission 1120 (or an uplink data retransmission) received from relay UE 1104. The destination device 1102 may also attempt to decode sidelink data retransmissions 1123 (or uplink data retransmissions) from the other relay UEs.

At 1304, the wireless device determines a resource of a wireless channel for transmitting feedback to the relay UE in response to the decoding attempt. For example, 1304 may be performed by resource component 1542. The wireless channel may comprise a PSFCH, for example. For instance, as described above with respect to FIG. 11 at 1116, the destination device 1102 may determine a resource (e.g., one or more slots, symbols, RBs, or sub-channels of PSFCH) in which to transmit feedback 1118 to the relay UE 1104 in response to the decoding attempt at 1114. The resource may be, e.g., a common PSFCH resource for all relays or a separate PSFCH resource for each relay in the case of destination UE 606, or a similar resource in another channel in the case of base station 608. Similarly, as described above at 1126, the destination device 1102 may determine a similar resource to transmit feedback 1128 to the relay UE 1104 in response to the decoding attempt at 1122.

The resource is based on a relay identifier associated with the UE. In one example, the relay identifier may be a common virtual relay identifier associated with a plurality of relay UEs including the UE. In another example, the relay identifier may be a physical relay identifier associated with the UE. For instance, as described above with respect to FIG. 11, the resource (e.g., the one or more slots, symbols, RBs, or sub-channels in which feedback is transmitted) may be a function of either the common virtual relay ID 1110 associated with the relays (the relay UEs 602 including relay UE 1104 in synchronous cooperative relaying) or the physical relay ID 1108 associated with the relay UE 1104 (in asynchronous cooperative relaying).

In one example, the feedback is groupcast to a plurality of relay UEs including the relay UE. For instance, as described above with respect to FIGS. 5, 7, and 11, in synchronous cooperative relaying, the destination 712 may provide groupcast ACK/NACK feedback (e.g., feedback 1118, 1128) in PSFCH 508, e.g., in the common PSFCH resource for all relays including relay UE 1104. In another example, the feedback is unicast to different relay UEs including the relay UE. For instance, as described above with respect to FIGS. 5, 7, and 11, in asynchronous cooperative relaying, the destination 712 may provide unicast ACK/NACK feedback (e.g., feedback 1118, 1128) in PSFCH 508, e.g., in the separate PSFCH resource for each relay including relay UE 1104.

The resource may be further based on a PSSCH resource carrying the data and an identifier of the wireless device. For example, as described above with respect to FIGS. 6, 7, and 11, the PSFCH resource may be a function of the PSSCH resource in second hop transmission 714 (e.g., the time or frequency resources carrying the PSSCH in unicast message 612). Moreover, the PSFCH resource may be a function of the destination identifier 1106.

At 1306, the wireless device may combine LLRs for the data and for a retransmission of the data. For example, 1306 may be performed by LLR combination component 1544. For instance, as described above with respect to FIG. 11, at 1124, and in attempt to decode the sidelink data retransmission at 1122, the destination device 1102 may combine LLRs for sidelink data 1112 with LLRs for sidelink data retransmission 1120. The destination device may also combine LLRs for sidelink data 1113 from other relay UEs with LLRs for sidelink data retransmissions 1123 from the other relay UEs.

The combined LLRs may be for a plurality of retransmissions of the data from a plurality of relay UEs including the relay UE. For example, as described above with respect to FIG. 9, in synchronous cooperative relaying, the destination 910 may combine LLRs across multiple transmissions or re-transmissions from a single relay. Alternatively, in asynchronous cooperative relaying, the destination 910 may combine LLRs across multiple transmissions or re-transmissions from multiple relays. For instance, as described above with respect to FIG. 11, at 1124, the destination device 1102 may combine LLRs for sidelink data 1112 from relay UE 1104 with LLRs for sidelink data 1113 from other relay UEs, or the destination device may combine LLRs for sidelink data retransmission 1120 from relay UE 1104 with LLRs for sidelink data retransmissions 1123 from other relay UEs. The destination device may combine LLRs for sidelink data transmissions or retransmissions across all relay UEs.

The LLRs may be flushed from a memory of the wireless device in response to successful decoding of the data. For example, as described above with respect to FIG. 9, after the destination 910 successfully decodes the second hop retransmission 912 due to combining its LLRs with previously stored LLRs in a buffer of memory (e.g., memory 460), at 924, the destination may flush the stored LLRs from its buffer.

Figure 14:
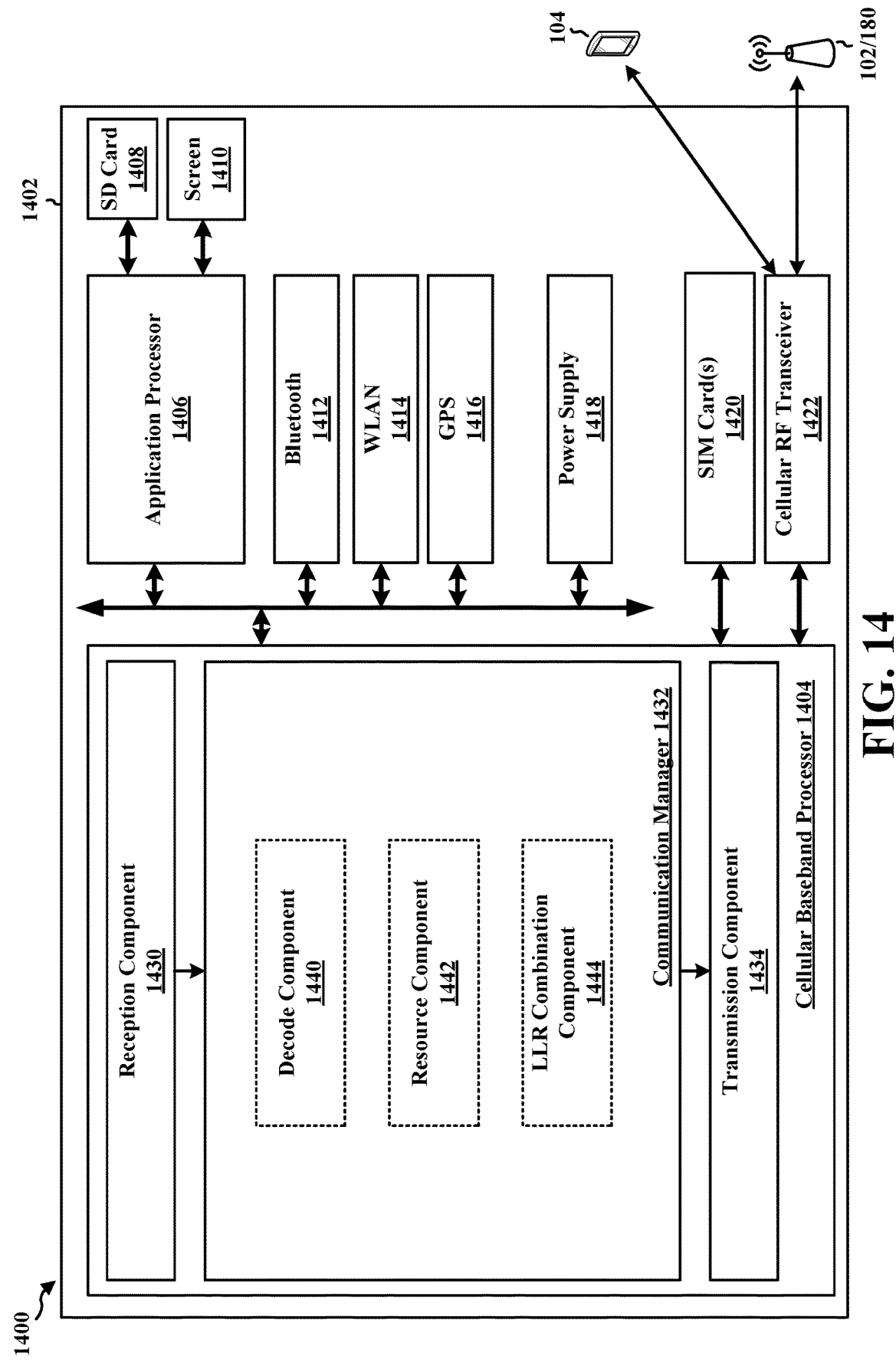
FIG. 14 is a diagram illustrating an example of a hardware implementation for an example apparatus.

FIG. 14 is a diagram 1400 illustrating an example of a hardware implementation for an apparatus 1402. The apparatus 1402 is a UE (e.g., a relay UE) and includes a cellular baseband processor 1404 (also referred to as a modem) coupled to a cellular RF transceiver 1422 and one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, and a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the device 410, 450 and may include the memory 460, 476 and/or at least one of the TX processor 416, 468, the RX processor 456, 470, and the controller/processor 459, 475. In one configuration, the apparatus 1402 may be a modem chip and include just the baseband processor 1404, and in another configuration, the apparatus 1402 may be the entire device (e.g., see 410, 450 of FIG. 4) and include the aforediscussed additional modules of the apparatus 1402.

The communication manager 1432 includes a decode component 1440 that is configured to attempt to decode sidelink data received from a source device for relay to a destination device, e.g., as described in connection with 1202. The communication manager 1432 further includes a resource component 1442 that receives input in the form of the decoding attempt from decode component 1440 and is configured to determine a resource of a wireless channel for transmitting feedback to the source device in response to the decoding attempt, where the resource is based on a relay identifier associated with the UE, e.g., as described in connection with 1204. The communication manager 1432 further includes a LLR combination component 1444 that receives input in the form of the sidelink data from the decode component and is configured to combine LLRs for the sidelink data and for a retransmission of the sidelink data, e.g., as described in connection with 1206.

The apparatus may include additional components that perform each of the blocks of the algorithm in the aforementioned flowcharts of FIGS. 10 and 12. As such, each block in the aforementioned flowcharts of FIGS. 10 and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the cellular baseband processor 1404, includes means for attempting to decode sidelink data received from a source device for relay to a destination device; and means for determining a resource of a wireless channel for transmitting feedback to the source device in response to the decoding attempt, where the resource is based on a relay identifier associated with the UE.

In one configuration, the apparatus 1402, and in particular the cellular baseband processor 1404, may include means for combining LLRs for the sidelink data and for a retransmission of the sidelink data.

The aforementioned means may be one or more of the aforementioned components of the apparatus 1402 configured to perform the functions recited by the aforementioned means. As described supra, the apparatus 1402 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 15:
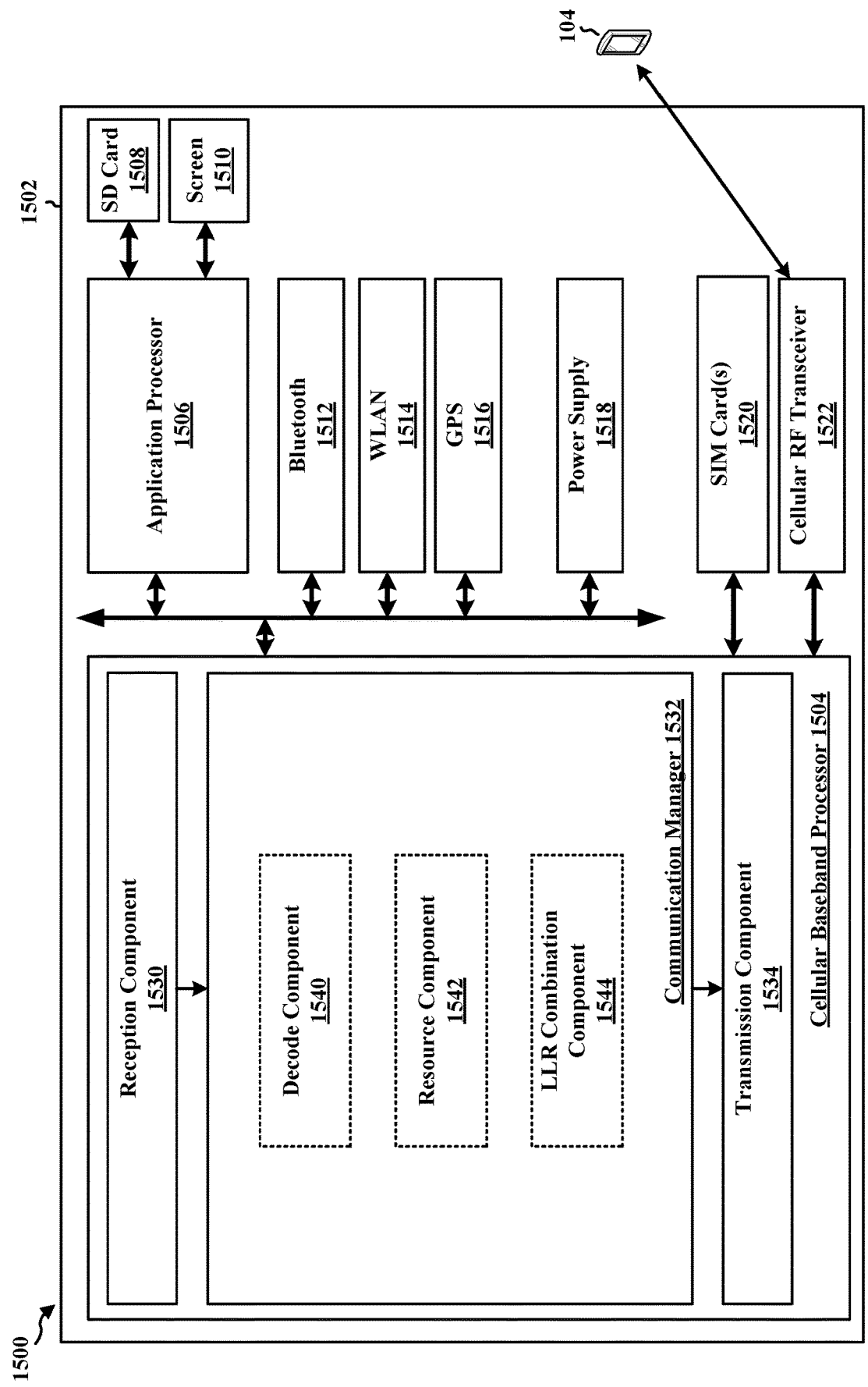
FIG. 15 is a diagram illustrating another example of a hardware implementation for another example apparatus.

FIG. 15 is a diagram 1500 illustrating an example of a hardware implementation for an apparatus 1502. The apparatus 1502 is a wireless device (e.g., a destination UE or a base station). When apparatus 1502 is a UE, the apparatus includes a cellular baseband processor 1504 (also referred to as a modem) coupled to a cellular RF transceiver 1522 and one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, and a power supply 1518. When apparatus 1502 is a base station, the apparatus includes a baseband unit. The cellular baseband processor 1504 or baseband unit communicates through the cellular RF transceiver 1522 with the UE 104. The cellular baseband processor 1504 or baseband unit may include a computer-readable medium/memory. The computer-readable medium/memory may be non-transitory. The cellular baseband processor 1504 or baseband unit is responsible for general processing, including the execution of software stored on the computer-readable medium/memory. The software, when executed by the cellular baseband processor 1504 or baseband unit, causes the cellular baseband processor 1504 or baseband unit to perform the various functions described supra. The computer-readable medium/memory may also be used for storing data that is manipulated by the cellular baseband processor 1504 or baseband unit when executing software. The cellular baseband processor 1504 or baseband unit further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the cellular baseband processor 1504 or baseband unit. The cellular baseband processor 1504 or baseband unit may be a component of the device 410, 450 and may include the memory 460, 476 and/or at least one of the TX processor 416, 468, the RX processor 456, 470, and the controller/processor 459, 475. In one configuration, the apparatus 1502 may be a modem chip and include just the baseband processor 1504, and in another configuration, the apparatus 1402 may be the entire device (e.g., see 410, 450 of FIG. 4) and include the aforediscussed additional modules of the apparatus 1502.

The communication manager 1532 includes a decode component 1540 that is configured to attempt to decode data received from a relay UE, e.g., as described in connection with 1302. The communication manager 1532 further includes a resource component 1542 that receives input in the form of the decoding attempt from decode component 1540 and is configured to determine a resource of a wireless channel for transmitting feedback to the relay UE in response to the decoding attempt, where the resource is based on a relay identifier associated with the relay UE, e.g., as described in connection with 1304. The communication manager 1532 further includes a LLR combination component 1544 that receives input in the form of the data from the decode component and is configured to combine LLRs for the data and for a retransmission of the data, e.g., as described in connection with 1306.

The apparatus may include additional components that perform each of the blocks of the algorithm in the aforementioned flowcharts of FIGS. 11 and 13. As such, each block in the aforementioned flowcharts of FIGS. 11 and 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the cellular baseband processor 1504 or baseband unit, includes means for attempting to decode data received from a relay UE; and means for determining a resource of a wireless channel for transmitting feedback to the relay UE in response to the decoding attempt, where the resource is based on a relay identifier associated with the relay UE.

In one configuration, the apparatus 1502, and in particular the cellular baseband processor 1504 or baseband unit, may include means for combining LLRs for the data and for a retransmission of the data.

Cooperative relaying allows for a source device to send sidelink data to neighboring relay UEs simultaneously via groupcast messaging, and the relay UEs may each send the obtained sidelink data to the destination device individually via unicast messaging. Thus, cooperative relaying may provide diversity and power gains as well as increased reliability and coverage compared to direct communication using a single relay. However, even when a source device transmit sidelink data to a destination device using cooperative relaying, any of the relays or destination device may still fail to decode the data. Aspects of the present disclosure therefore provide for HARQ feedback and retransmission procedures for synchronous and asynchronous cooperative relaying.

For example, relays may derive a shared PSFCH resource as a function of a common virtual relay ID for providing ACK-only feedback in synchronous cooperative relaying, and relays may derive a separate PSFCH resource as a function of physical relay ID for providing ACK/NACK feedback in asynchronous cooperative relaying. Thus, a source device may receive HARQ feedback from each relay and retransmit sidelink data accordingly in the event any of the relays fail to decode the sidelink data. Similarly, a destination may derive a common PSFCH resource for all relays as a function of a common virtual relay ID for providing groupcast ACK/NACK feedback in synchronous cooperative relaying, and the destination may derive a separate PSFCH resource for each relay as a function of physical relay ID for providing unicast ACK/NACK feedback in asynchronous cooperative relaying. Thus, each relay may receive HARQ feedback from the destination and retransmit sidelink data accordingly in the event the destination fails to decode the sidelink data.

Moreover, each relay and the destination may apply HARQ combining (e.g., store and combine LLRs of sidelink data transmissions and retransmissions) to increase the likelihood of successful decoding. To allow relays to efficiently store LLRs in memory, a timer may be implemented where a relay's stored LLRs are flushed in response to expiration of the timer. Moreover, in synchronous cooperative relaying, relays may flush stored LLRs from the buffer earlier than the timer expiration in response to HARQ feedback from the destination. The destination may combine LLRs across multiple transmissions and retransmissions from each relay to improve the likelihood of successfully decoding sidelink data. The destination may also flush its buffer of stored LLRs following successful decoding of a sidelink data retransmission.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is a method of wireless communication at a user equipment (UE), comprising: attempting to decode sidelink data received from a source device for relay to a destination device; and determining a resource of a wireless channel for transmitting feedback to the source device in response to the decoding attempt, wherein the resource is based on a relay identifier associated with the UE.

Example 2 is the method of Example 1, wherein the wireless channel comprises a physical sidelink feedback channel (PSFCH).

Example 3 is the method of any of Examples 1 and 2, wherein the resource is shared among a plurality of relay UEs including the UE.

Example 4 is the method of any of Examples 1 and 2, wherein the resource is individually configured for different relay UEs including the UE.

Example 5 is the method of any of Examples 1 to 4, wherein the resource is further based on a physical sidelink shared channel (PSSCH) resource carrying the sidelink data and an identifier of the source device.

Example 6 is the method of any of Examples 1 to 5, wherein the relay identifier is a common virtual relay identifier associated with a plurality of relay UEs including the UE.

Example 7 is the method of any of Examples 1 to 5, wherein the relay identifier is a physical relay identifier associated with the UE.

Example 8 is the method of any of Examples 1 to 7, further comprising: combining log-likelihood ratios (LLRs) for the sidelink data and for a retransmission of the sidelink data.

Example 9 is the method of Example 8, wherein the LLRs are flushed from a memory of the UE in response to expiration of a timer.

Example 10 is the method of Example 8, wherein the LLRs are flushed from a memory of the UE prior to expiration of a timer in response to an acknowledgment of the sidelink data from the destination device.

Example 11 is an apparatus for wireless communication, comprising: a processor; memory coupled with the processor; and instructions stored in the memory and operable, when executed by the processor, to cause the apparatus to: attempt to decode sidelink data received from a source device for relay to a destination device; and determine a resource of a wireless channel for transmitting feedback to the source device in response to the decoding attempt, wherein the resource is based on a relay identifier associated with the UE.

Example 12 is the apparatus of Example 11, wherein the resource is shared among a plurality of relay UEs including the apparatus, or the resource is individually configured for different relay UEs including the apparatus.

Example 13 is the apparatus of any of Examples 11 and 12, wherein the relay identifier is a common virtual relay identifier associated with a plurality of relay UEs including the apparatus, or a physical relay identifier associated with the apparatus.

Example 14 is the apparatus of any of Examples 11 to 13, wherein the instructions, when executed by the processor, further cause the apparatus to: combine log-likelihood ratios (LLRs) for the sidelink data and for a retransmission of the sidelink data.

Example 15 is the apparatus of Example 14, wherein the LLRs are flushed from a memory of the apparatus in response to expiration of a timer.

Example 16 is the apparatus of Example 14, wherein the LLRs are flushed from a memory of the apparatus prior to expiration of a timer in response to an acknowledgment of the sidelink data from the destination device.

Example 17 is a method of wireless communication at a wireless device, comprising: attempting to decode data received from a relay user equipment (UE); and determining a resource of a wireless channel for transmitting feedback to the relay UE in response to the decoding attempt, wherein the resource is based on a relay identifier associated with the relay UE.

Example 18 is the method of Example 17, wherein the wireless channel comprises a physical sidelink feedback channel (PSFCH).

Example 19 is the method of any of Examples 17 and 18, wherein the feedback is groupcast to a plurality of relay UEs including the relay UE.

Example 20 is the method of any of Examples 17 and 18, wherein the feedback is unicast to different relay UEs including the relay UE.

Example 21 is the method of any of Examples 17 to 20, wherein the resource is further based on a physical sidelink shared channel (PSSCH) resource carrying the data and an identifier of the wireless device.

Example 22 is the method of any of Examples 17 to 21, wherein the relay identifier is a common virtual relay identifier associated with a plurality of relay UEs including the relay UE.

Example 23 is the method of any of Examples 17 to 21, wherein the relay identifier is a physical relay identifier associated with the relay UE.

Example 24 is the method of any of Examples 17 to 23, further comprising: combining log-likelihood ratios (LLRs) for the data and for a retransmission of the data.

Example 25 is the method of Example 24, wherein the combined LLRs are for a plurality of retransmissions of the data from a plurality of relay UEs including the relay UE.

Example 26 is the method of any of Examples 24 and 25, wherein the LLRs are flushed from a memory of the wireless device in response to successful decoding of the data.

Example 27 is an apparatus for wireless communication, comprising: a processor; memory coupled with the processor; and instructions stored in the memory and operable, when executed by the processor, to cause the apparatus to: attempt to decode data received from a relay user equipment (UE); and determine a resource of a wireless channel for transmitting feedback to the relay UE in response to the decoding attempt, wherein the resource is based on a relay identifier associated with the relay UE.

Example 28 is the apparatus of Example 27, wherein the feedback is groupcast to a plurality of relay UEs including the relay UE, or the feedback is unicast to different relay UEs including the relay UE.

Example 29 is the apparatus of any of Examples 27 and 28, wherein the relay identifier is a common virtual relay identifier associated with a plurality of relay UEs including the relay UE, or the relay identifier is a physical relay identifier associated with the relay UE.

Example 30 is the apparatus of any of Examples 27 to 29, wherein the instructions, when executed by the processor, further cause the apparatus to: combine log-likelihood ratios (LLRs) for the data and for a retransmission of the data.

What is claimed is:

1. A method of wireless communication at a user equipment (UE), comprising:
   obtaining a relay identifier associated with the UE;
   attempting to decode sidelink data received from a source device for relay to a destination device;
   determining a resource of a wireless channel for transmitting feedback to the source device in response to the decoding attempt, wherein the resource is determined to be a shared resource among relay UEs including the UE at least in part when the obtained relay identifier associated with the UE is a common virtual relay identifier associated with the relay UEs that is obtained after a relay discovery procedure between the UE and the source device; and
   transmitting the feedback in the resource to the source device.

2. The method of claim 1, wherein the wireless channel comprises a physical sidelink feedback channel (PSFCH).

3. The method of claim 1, wherein the resource is determined to be an individually configured resource for one of different relay UEs at least in part when the obtained relay identifier associated with the UE is not the common virtual relay identifier.

4. The method of claim 1, wherein the resource is further based on a physical sidelink shared channel (PSSCH) resource carrying the sidelink data and an identifier of the source device.

5. The method of claim 1, wherein the common virtual relay identifier is different than a physical relay identifier of the UE obtained during the relay discovery procedure.

6. The method of claim 5, wherein the physical relay identifier is a Proximity Services (ProSe) relay UE identifier.

7. The method of claim 1, further comprising:
   combining log-likelihood ratios (LLRs) for the sidelink data and for a retransmission of the sidelink data.

8. The method of claim 7, wherein the LLRs are flushed from a memory of the UE in response to expiration of a timer.

9. The method of claim 7, wherein the LLRs are flushed from a memory of the UE prior to expiration of a timer in response to an acknowledgment of the sidelink data from the destination device.

10. An apparatus for wireless communication, comprising:
    a processor;
    memory coupled with the processor; and
    instructions stored in the memory and operable, when executed by the processor, to cause the apparatus to:
      obtain a relay identifier associated with the apparatus;
      attempt to decode sidelink data received from a source device for relay to a destination device;
      determine a resource of a wireless channel for transmitting feedback to the source device in response to the decoding attempt, wherein the resource is determined to be a shared resource among relay UEs including the apparatus at least in part when the obtained relay identifier associated with the apparatus is a common virtual relay identifier associated with the relay UEs that is obtained after a relay discovery procedure between the apparatus and the source device; and
      transmit the feedback in the resource to the source device.

11. The apparatus of claim 10, wherein the resource is further based on a physical sidelink shared channel (PSSCH) resource carrying the sidelink data and an identifier of the source device.

12. The apparatus of claim 10, wherein the resource is determined to be an individually configured resource for one of different relay UEs at least in part when the obtained relay identifier associated with the apparatus is not the common virtual relay identifier.

13. The apparatus of claim 10, wherein the instructions, when executed by the processor, further cause the apparatus to:
    combine log-likelihood ratios (LLRs) for the sidelink data and for a retransmission of the sidelink data.

14. The apparatus of claim 13, wherein the LLRs are flushed from the memory of the apparatus in response to expiration of a timer.

15. The apparatus of claim 13, wherein the LLRs are flushed from the memory of the apparatus prior to expiration of a timer in response to an acknowledgment of the sidelink data from the destination device.

16. A method of wireless communication at a wireless device, comprising:
- attempting to decode data received from a relay user equipment (UE);
- determining a resource of a wireless channel for transmitting feedback to the relay UE in response to the decoding attempt, wherein the resource is determined to be a shared resource among relay UEs including the relay UE at least in part when a common virtual relay identifier associated with the relay UEs is obtained from the relay UE after a relay discovery procedure between the relay UE and the wireless device; and
- transmitting the feedback in the resource to the relay UE.

17. The method of claim 16, wherein the wireless channel comprises a physical sidelink feedback channel (PSFCH).

18. The method of claim 16, wherein the feedback is groupcast in the shared resource to the relay UEs including the relay UE.

19. The method of claim 16, wherein the resource is determined to be an individually configured resource for one of different relay UEs at least in part when the common virtual relay identifier is not obtained from the relay UE after the relay discovery procedure, and the feedback is unicast in the individually configured resource to the one of the different relay UEs.

20. The method of claim 16, wherein the resource is further based on a physical sidelink shared channel (PSSCH) resource carrying the data and an identifier of the wireless device.

21. The method of claim 16, wherein the common virtual relay identifier is different than a physical relay identifier associated with the relay UE during the relay discovery procedure.

22. The method of claim 21, wherein the physical relay identifier is a Proximity Services (ProSe) relay UE identifier.

23. The method of claim 16, further comprising:
- combining log-likelihood ratios (LLRs) for the data and for a retransmission of the data.

24. The method of claim 23, wherein the combined LLRs are for a plurality of retransmissions of the data from a plurality of relay UEs including the relay UE.

25. The method of claim 23, wherein the LLRs are flushed from a memory of the wireless device in response to successful decoding of the data.

26. An apparatus for wireless communication, comprising:
- a processor;
- memory coupled with the processor; and
- instructions stored in the memory and operable, when executed by the processor, to cause the apparatus to:
  - attempt to decode data received from a relay user equipment (UE);
  - determine a resource of a wireless channel for transmitting feedback to the relay UE in response to the decoding attempt, wherein the resource is determined to be a shared resource among relay UEs including the relay UE at least in part when a common virtual relay identifier associated with the relay UEs is obtained from the relay UE after a relay discovery procedure between the relay UE and the apparatus; and
  - transmit the feedback in the resource to the relay UE.

27. The apparatus of claim 26, wherein the resource is further based on a physical sidelink shared channel (PSSCH) resource carrying the data and an identifier of the apparatus.

28. The apparatus of claim 26, wherein the resource is determined to be an individually configured resource for one of different relay UEs at least in part when the common virtual relay identifier is not obtained from the relay UE after the relay discovery procedure.

29. The apparatus of claim 26, wherein the instructions, when executed by the processor, further cause the apparatus to:
- combine log-likelihood ratios (LLRs) for the data and for a retransmission of the data.

* * * * *